(12) United States Patent
Wong

(10) Patent No.: US 6,901,072 B1
(45) Date of Patent: May 31, 2005

(54) SYSTEM AND METHOD FOR HIGH SPEED PACKET TRANSMISSION IMPLEMENTING DUAL TRANSMIT AND RECEIVE PIPELINES

(75) Inventor: Yuen Fai Wong, San Jose, CA (US)

(73) Assignee: Foundry Networks, Inc., San Jose, CA (US)

( * ) Notice: Subject to any disclaimer, the term of this patent is extended or adjusted under 35 U.S.C. 154(b) by 74 days.

(21) Appl. No.: 10/438,545

(22) Filed: May 15, 2003

(51) Int. Cl.$^7$ .............................................. H04L 12/28
(52) U.S. Cl. ...................................... 370/389; 370/360
(58) Field of Search ................................ 370/360, 363, 370/365, 368, 371, 374, 378, 381, 389, 395.7, 395.71, 419, 428, 423, 463, 474

(56) References Cited

U.S. PATENT DOCUMENTS

| | | | | |
|---|---|---|---|---|
| 6,076,115 A | * | 6/2000 | Sambamurthy et al. | ..... 709/250 |
| 6,160,809 A | * | 12/2000 | Adiletta et al. | ............. 370/392 |
| 6,172,990 B1 | * | 1/2001 | Deb et al. | .................... 370/474 |
| 6,424,658 B1 | * | 7/2002 | Mathur | ........................ 370/429 |

* cited by examiner

Primary Examiner—Wellington Chin
Assistant Examiner—Brenda Pham
(74) Attorney, Agent, or Firm—Brown Raysman Millstein Felder & Steiner LLP

(57) ABSTRACT

The present invention provides systems and methods for providing data transmission speeds at or in excess of 10 gigabits per second between one or more source devices and one or more destination devices. According to one embodiment, the system of the present invention comprises a first and second media access control (MAC) interfaces to facilitate receipt and transmission of packets over an associated set of physical interfaces. The system also contemplates a first and second field programmable gate arrays (FPGA) coupled to the MAC interfaces and an associated first and second memory structures, the first and second FPGAs are configured to perform initial processing of packets received from the first and second MAC interfaces and to schedule the transmission of packets to the first and second MAC interface for transmission to one or more destination devices. The first and second FPGAs are further operative to dispatch and retrieve packets to and from the first and second memory structures. A third FPGA, coupled to the first and second memory structures and a backplane, is operative to retrieve and dispatch packets to and from the first and second memory structures, compute appropriate destinations for packets and organize packets for transmission. The third FPGA is further operative to receive and dispatch packets to and from the backplane.

39 Claims, 13 Drawing Sheets

SYSTEM AND METHOD FOR HIGH SPEED PACKET TRANSMISSION IMPLEMENTING DUAL TRANSMIT AND RECEIVE PIPELINES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention described herein relates to computer networking and, in particular, to improved methods, systems, and software for routing data at high speeds through a switch or other network routing device.

The explosive growth of the Internet has brought more and more users online every day, and computer networks have assumed an increasingly important role in today's highly interconnected world. As users increasingly rely on the network to deliver required data, network traffic has increased exponentially. Moreover, with the adoption of new and more bandwidth-intensive applications, enormous burdens are placed on network infrastructure. Network administrators are thus constantly seeking faster and more reliable methods and equipment to transport data to accommodate these demands.

Ethernet, one of the earliest networking protocols, is today the most widely used method to transport data in computer networks. Robert Metcalf and David Boggs developed Ethernet as an experiment at the XEROX Palo Alto Research Center in 1973. At Ethernet's inception, the struggle to accommodate users' needs for bandwidth had not yet started. As network traffic demands at this time were quite low, Ethernet initially had a data transmission rate of 2.94 megabits per second (Mbps).

Metcalf, however, recognized the potential for rapid network growth and posited a theorem now known as "Metcalf's Law" which states that the value of a network expands exponentially as the number of users increase. Gordon Moore, an expert in the field of semiconductor development, posited another theorem known as Moore's Law which states that the power of microprocessors will double every 18 months and their price will be reduced by half. When taken together, these two laws predict rapid growth of networking technologies: as users join the network, more people will want to join at an exponential rate equivalent to the rise in value of the network, while processing technologies to support this growth and faster transport are constantly increasing at rapidly diminishing costs.

The evolution of Ethernet technologies has followed theory. The first commercial release of Ethernet occurred in 1979 with a transmission rate of 10 Mbps—more than a three-fold increase over the experimental system created just five years earlier. Ethernet went through a variety of standardizations during the 1980s and line rates remained constant at 10 Mbps while the technology matured. In 1995, however, Ethernet became available at 100 Mbps. In 1998, bandwidth jumped again to 1 gigabit per second (Gbps). Most recently, a new standard was adopted for Ethernet transmission rates at 10 Gbps representing a 100-fold increase in seven years.

Implementation of 10 Gbps network infrastructure requires overcoming significant hurdles not addressed by current advances in the art. For example, previous generations of Ethernet technology, although fast, had an ample number of clocks in which to perform packet analysis and retransmit data. With the rise of 10 Gbps Ethernet, however, calculations previously carried out over a given number of clocks must now be completed in a fraction of the time so that the desired bandwidth is in fact available.

There is thus a need for a systems and methods capable of efficiently accommodating data transfer rates over a network in excess of 10 Gbps.

SUMMARY OF THE INVENTION

The present invention provides systems and methods for providing data transmission speeds at or in excess of 10 gigabits per second between one or more source devices and one or more destination devices. According to one embodiment, the system of the present invention comprises a first and second media access control (MAC) interfaces to facilitate receipt and transmission of packets over an associated set of physical interfaces. The system also contemplates a first and second field programmable gate arrays (FPGA) coupled to the MAC interfaces and an associated first and second memory structures, the first and second FPGAs are configured to perform initial processing of packets received from the first and second MAC interfaces and to schedule the transmission of packets to the first and second MAC interface for transmission to one or more destination devices. The first and second FPGAs are further operative to dispatch and retrieve packets to and from the first and second memory structures. A third FPGA, coupled to the first and second memory structures and a backplane, is operative to retrieve and dispatch packets to and from the first and second memory structures, compute appropriate destinations for packets and organize packets for transmission. The third FPGA is further operative to receive and dispatch packets to and from the backplane.

In accordance with certain aspects of the present invention, the third FPGA is an integrated circuit which is configured to retrieve and dispatch packets to and from one or more memory structures in a switching or routing device and a backplane in the switching or routing device. The integrated circuit includes a plurality of cores each operative to provide a receive and transmit pipeline for packets corresponding to a given one of the ports on the switching or routing device. The first and second transmit cores are further operative to receive packets from the memory structures and process the packets for dispatch to their intended destinations. The IC also includes a local switching FIFO in each core operative to transfer packets between the core and a second of the cores corresponding to a port for the second core.

In some embodiments, the cores each comprise a transmit quality of service module operative to determine the order in which packets received at a given one of the cores from the backplane and the local switching FIFO are transmitted to a given one of the memory structures. This order may be determined based on quality of service data read from the header of the packet and in accordance with any desired prioritization algorithm.

In further embodiments, the integrated circuit has a backplane transmit sorter, coupled between the cores and the backplane, operative to organize packets for dispatch to one or more slots on the backplane. The backplane transmit sorter may implement a number of FIFOs to organize packets prior to transmission to the one or more slots on the backplane, which may be equal to a number of slots on the backplane.

The integrated circuit may further include other elements, such as a receive FIFO arbiter, coupled between the cores and the backplane, operative to arbitrate the receipt of data from a plurality of transmit cores for placement in one or more receive FIFOs, and a backplane transmit grouper, coupled between the cores and the backplane, operative to modify the size of a packet for transmission over the backplane.

In accordance with other aspects, the present invention, a system is described for providing data transmission speeds at or in excess of 10 gigabits per second between one or more source devices and one or more destination devices. The system includes first and second transmit and receive data pipelines, the first and second transmit and receive data pipelines being used to couple first and second media access control (MAC) interfaces to facilitate receipt and transmission packets over a physical interface, and first and second packet processors configured to perform initial processing of received packets that are buffered in first and second memory structures. The system also includes third and fourth transmit and receive data pipelines used to couple a transmission manager to a backplane and the first and second transmit and receive data pipelines. The third and fourth transmit and receive data pipelines are configured to receive packets from a backplane, organize the packets for transmission that are buffered in the first and second memory structures and schedule the transmission of packets on the backplane.

In accordance with still further aspects of the present invention, a method is described for providing data transmission speeds at or in excess of 10 gigabits per second between one or more source devices and one or more destination devices. The method involves receiving packets over a first and second media access control (MAC) interfaces, the first and second MAC interfaces operative to facilitate receipt and transmission of packets over a first and second physical interfaces. Data is pipelined bi-directionally through first and second processors coupled to the first and second MAC interfaces and first and second memory structures. The first and second processors are each configured to perform initial processing of received packets to be buffered in the first and second memory structures and scheduling packets for transmission to the MAC interfaces for transmission to one or more destination devices over the first and second physical interfaces. The first and second processors are further operative to dispatch and retrieve packets to and from the first and second memory structures. Dual bi-directional data pipelines are implemented through a third processor coupled to the first and second memory structures and a backplane, the second processor configured to compute an appropriate destination for a packet and organize packets for transmission.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

Figure 1:
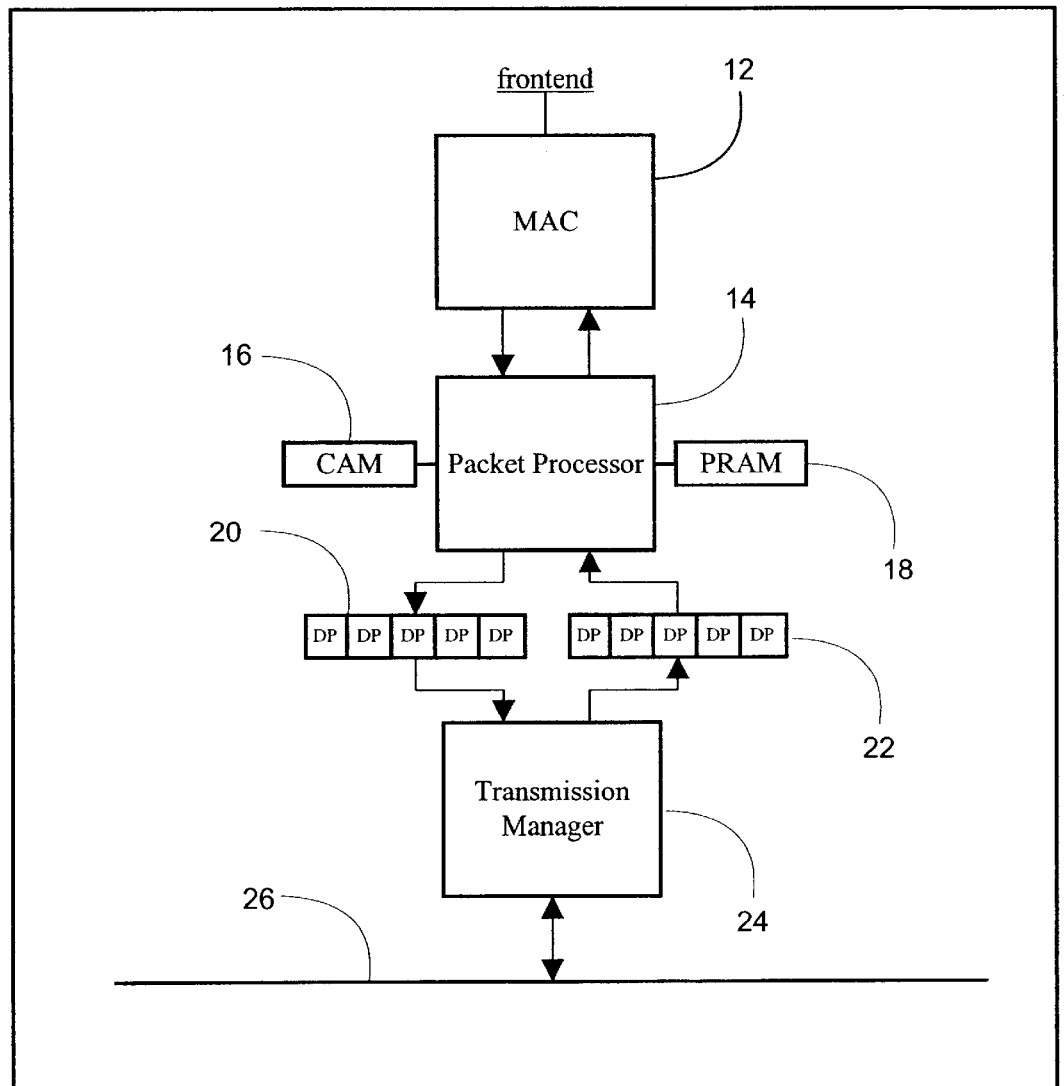
FIG. 1 is a block diagram of a system architecture for an Ethernet blade in accordance with one embodiment of the present invention.

Embodiments of methods and systems according to the present invention are described through reference to FIGS. 1 through 8. Turning to FIG. 1, a block diagram is presented depicting a high-level schematic of the components of one possible embodiment of the invention to allow data transfer speeds at or in excess of 10 gigabits per second. As shown, the invention comprises a printed circuit board ("PCB") 10 used to house and provide interconnections for a media access controller ("MAC") 12, a packet processor ("PP") 14, one or more content addressable memory ("CAM") controllers 16, one or more controllers for random access memories containing parameter information ("PRAM") processors 18, a receive dual-port memory buffer 20, a transmit dual-port memory buffer 22, a transmission manager 24, and a backplane interface 26.

The PCB 10 provides a surface on which to place other components of the invention. The PCB 10, also known as a "blade" or "module", can be inserted into a slot on the chassis of a network traffic management device such as a switch or a router. This modular design allows for flexible configurations with different combinations of blades in the various slots of the device according to differing network topologies and switching requirements. Furthermore, additional ports for increased network connectivity may easily added by plugging additional blades into free slots located in the chassis.

An example of such a switch is the BigIron® switch produced by Foundry Networks, Inc. of San Jose, Calif. The BigIron switch chassis consists of multiple distributed switching modules each of which contain a high-bandwidth memory system for scalable chassis bandwidth. The local switching fabric of the BigIron switch houses the forwarding engines, provides packet-level examination and classification based on Layer 2/3/4 information, and performs IP subnet look-ups and packet modifications of IP and IPX packets.

The MAC 12 is the interface by which data is received and transmitted to and from the network. In one embodiment, such network data comprises Ethernet packets. The MAC 12 forwards received packets to the PP 14 for further processing and also receives packets for transmission to the network from the PP 14. The MAC 12 performs any data conversions required for network data to be processed by the PP 14 for routing within the device chassis and for data processed by PP 14 to be transmitted to the network. For example, in one embodiment of the invention, the MAC 12 performs data conversions because network data comprises 32 bit double data rate ("DDR") data, while the PP 14 processes only 64 bit single data rate ("SRD") data. The MAC is typically responsible for data validity checking, as well as data gathering.

The PP 14 is a processor chip responsible for receiving packets from the MAC 12 and processing them for forwarding through the device chassis, as well as for processing packets received from the device chassis intended for transmission over the network. These two functions, while performed on the same chip, are preferably performed simultaneously and in parallel. There are thus, in a sense, two pipelines in the PP 14: a receive pipeline for processing network packets intended for transmission within the chassis and a transmit pipeline for processing internally routed packets intended for transmission over the network.

In one embodiment of the invention, the packet processor is a field programmable gate array ("FPGA"), which is an integrated circuit that can be programmed in the field after manufacture. An advantage of using FPGAs with the invention is that an FPGA provides significant flexibility over an application specific integrated circuit ("ASIC") and is also much less expensive to prototype and implement.

The receive pipeline of the PP 14 is responsible for packet classification, performing CAM and PRAM lookups, generating packet headers for forwarding packets through a chassis, and preparing packet modifications. Network packets are received by the PP 14 from the MAC 12 in multi-byte bursts based on scheduling priorities determined at the MAC 12. The PP 14 examines packets and extracts packet forwarding information from the packets such as the destination address ("DA") of the packet and the source address ("SA") of the packet. The PP 14 extracts the type of service ("TOS"), whether the packet has a virtual local area network ("VLAN") tag, session related data such as in the case of IPv4 or IPX data, and other additional Layer 3 and Layer 4 information useful in routing the packet through the chassis. The PP 14 passes this forwarding information extracted from the packet header to a CAM processor 16 for further processing.

The CAM controller or processor 16 takes information forwarded by the PP 14 and performs a lookup comparing this information to data stored in a local memory of the CAM processor 16. If the information matches information stored in the local memory of the CAM processor 16, additional forwarding information regarding disposition of the packet is available in the local memory of the PRAM processor 18 and can be retrieved for future incorporation into the packet header.

When such successful CAM matches occur, the PRAM processor 18 retrieves additional forwarding information from its local memory for incorporation into the header of the packet. The packet is reformatted with a new internal hardware header for routing the packet within the chassis and stored in the receive dual-port memory buffer 20 for processing by the transmission manager. This internal hardware header is also sometimes referred to as a chassis header.

An important technique in implementing the invention is pipelining. Pipelining is an advanced technique used by processors, wherein a processor begins executing a subsequent instruction before a prior instruction has finished executing. Accordingly, a processor can have multiple instructions processing in its "pipeline" simultaneously with each instruction at a different processing stage.

The pipeline is divided into processing segments, with each segment executing its operation concurrently with the other segments. When a segment completes its operation, it passes the result to the next segment in the pipeline and fetches data for processing from the preceding segment. Often, temporary memory buffers are used to hold data values between segments, which allows operations to complete faster since each segment no longer waits for the other segment to finish processing prior to handing off data. The final results of the process emerge at the end of the pipeline in rapid succession.

The receive dual-port memory 20 (as well as its counterpart, the transmit dual-port memory 22) acts as a pipeline buffer in the embodiment of the invention depicted in FIG. 1. The receive dual-port memory 20 enables the PP 14 to store processed data and continue processing the next packet without having to wait for the transmission manager 24 to become available, thereby expediting operations of both the PP 14 and the transmission manager 24. Other buffers are used throughout the invention and in its various components to achieve pipelining and faster packet processing in an analogous manner.

The transmit pipeline of the PP 14 retrieves data from the transmit dual-port memory 22 according to a programmable priority scheme. The PP 14 extracts network destinations from the dual-port data and reassembles packet header forwarding information by removing any packet header modifications that take place in order to route the packet through the switch chassis. The PP 14 performs sanity checks on packet data to ensure that only those packets intended for transmission are passed on to the MAC 12.

Since packets routed through the chassis carry header information pertaining to forwarding within the chassis, this information must be removed and replaced with header forwarding information appropriate for routing over the network. After the proper network header forwarding information is reassembled and the chassis header information is removed, the PP 14 forwards the data to the MAC 12 for eventual transmission over the network to the intended address.

While the PP 14 handles traffic to and from the MAC 12 and conversions of packet headers between network packet headers and internal chassis packet headers, the transmission manager 24 handles traffic flow to and from the backplane interface 114. Like the PP 14, the transmission manager 24 is a processor chip that implements a dual pipeline architecture: a receive pipeline for network data to be internally routed within the device chassis and a transmit pipeline for internally routed data intended for network transmission. These two functions, while performed on the same chip, are preferably performed in parallel according to one embodiment of the invention. In one embodiment of the invention, the transmission manager 24 is an FPGA, although use of other processor types is within the scope of the invention.

The transmission manager 24 fetches network data intended for routing through the device chassis from the receive dual-port memory 20 and stores internally routed data intended for network transmission in the transmit dual-port memory 22. The receive pipeline of the transmission manager 24 retrieves data from the receive dual-port memory 20 according to instructions issued to the transmission manager 24 by the PP 14. The transmission manager 24 determines data transmission priority for the data retrieved and schedules transmissions to the backplane 26 according to this priority scheme. In one embodiment of the invention, there are four different priority levels assigned to data.

The transmission manager 24 extracts backplane destinations from data, and sends data to those destinations according to predetermined priority algorithms. Backplane destinations may comprise other blades in the chassis or, in some cases, may comprise the blade of the transmission manager 24 itself, which is called "one-armed routing."

The transmit pipeline of the transmission manager 24 handles internally routed packets received from the backplane interface 26 and intended for transmission over the network. The transmission manager 24 collects packets from the backplane interface 26 and organizes them into per-source, per-priority transmit queues stored in the transmit dual-port memory 22. The transmission manager 24 notifies the PP 14 when a packet is stored in the transmit dual-port memory 22 and available for processing.

Figure 1A:
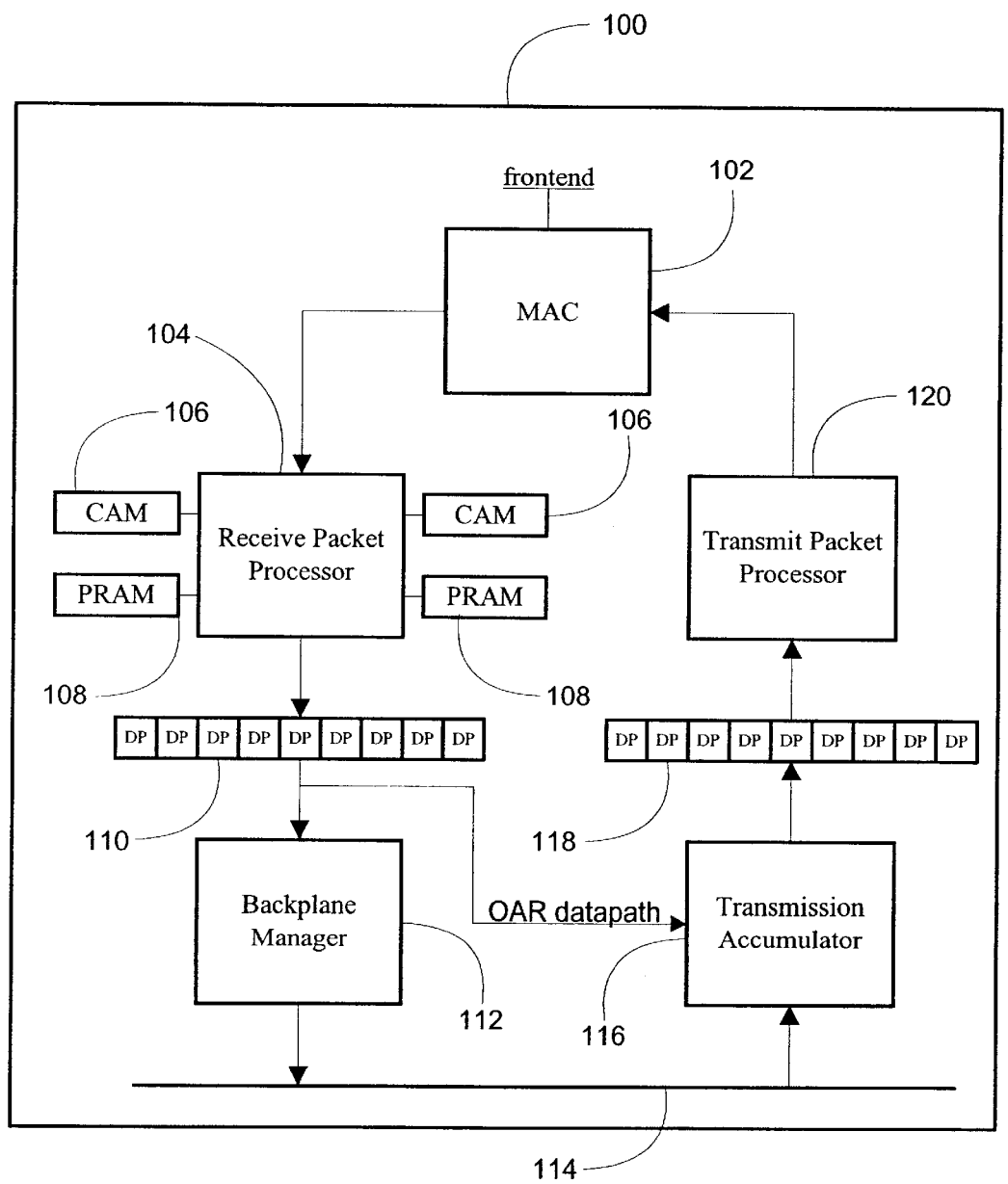
FIG. 1A is a block diagram of a system architecture for an Ethernet blade in accordance with a second embodiment of the present invention.

FIG. 1a, presents a block diagram depicting a high-level schematic of the components of an alternative embodiment of the invention. As shown, the invention comprises a printed circuit board 100, a media access controller 102, a receive packet processor 104 ("RXPP"), one or more CAM processors 106, one or more PRAM memory processors 108, a receive dual-port memory buffer 110, a backplane manager 112, a backplane interface 114, a transmission accumulator ("TX accumulator") 116, a transmit dual-port memory buffer 118, and a transmit packet processor ("TXPP") 120.

The PCB 100 provides a surface on which to place many of the other components of the invention. The PCB 100, also known as a "blade" or "module", can be inserted into one of a plurality of slots on the chassis of a network traffic management device such as a switch or a router. This modular design allows for flexible configurations with different combinations of blades in the various slots of the device according to differing network topologies and switching requirements.

The MAC 102 is the interface by which a blade receives and transmits data to and from the network. In one embodiment, such network data comprises Ethernet packets. The MAC 102 forwards received packets to the RXPP 104 for further processing and receives packets for transmission to the network from the TXPP 120. The MAC 102 also performs any data conversions required for network data to be processed by the RXPP 104 or for data processed by TXPP 120 to be transmitted to the network. For example, the MAC 102 may perform data timing conversions where network data comprises 32 bit DDR data while the RXPP 104 and the TXPP 120 process only 64 bit SDR data.

The receive packet processor 104 is responsible for packet classification, performing CAM and PRAM lookups, generating packet headers for forwarding packets through a chassis, and preparing packet modifications. In one embodiment of the invention, the receive packet processor 104 is an FPGA. In an alternate embodiment of the invention, the RXPP 104 is an ASIC. Packets are received by the RXPP 104 from the MAC 102 in multi-byte bursts based on scheduling priorities determined at the MAC 102. The RXPP 104 examines packets and extracts packet forwarding information from a packet, such as the destination address of the packet and the source address of the packet. The RXPP 104 extracts the TOS, any defined VLAN tags, session related data such as in the case of Ipv4 or IPX data, and other additional Layer 3 and Layer 4 information useful in routing the packet through the chassis. The RXPP 104 passes this forwarding information to one of the CAM processors 106 for further examination.

The CAM processor 106 takes information forwarded by the RXPP 104 and performs a lookup, comparing received information to data stored in local memory of the CAM processor 106. If the comparison returns a match, additional forwarding information regarding disposition of the packet is stored in local memory of one of the PRAM processors 108 and can be retrieved for future incorporation into the packet header. The PRAM processor 108 retrieves additional forwarding information from its local memory for incorporation into the header of packet. The packet is then stored in the receive dual-port memory buffer 110 for processing by the backplane manager 112. Those of skill in the art will recognize that additional processing may be performed before storage in the receive dual port memory.

The receive dual-port memory 110 (as well as its counterpart, the transmit dual-port memory 118) acts as a pipeline buffer between processes. The receive dual-port memory 110 enables the RXPP 104 to store processed data and continue processing the next packet without having to wait for the backplane manager 112 to become available. Pipelining operation execution expedites processing of both the RXPP 104 and the backplane manager 112. Other buffers are used throughout the invention and within its various components to achieve pipelining and faster packet processing in this manner.

The next segment in the receive pipeline is the backplane manager 112. The backplane manager 112 is a processor designed for retrieving data from the receive dual-port memory buffer 110 and dispatching packets to the backplane interface 114. Data is retrieved from the receive dual-port memory 110 according to instructions issued to the backplane manager 112 by the RXPP 104. The backplane manager 112 determines data transmission priority for the data retrieved and schedules transmissions to the backplane 114 according to this priority scheme. According to one embodiment of the invention, there are four different priority levels assigned to data.

The backplane manager 112 extracts backplane destinations from received data; the data sent to indicated destinations according to programmable priority algorithms. Backplane destinations may comprise other blades in the chassis or, in the case of OAR, may comprise the blade of the backplane manager 112 that initially receives the data. When packets scheduled for OAR are detected, they are forwarded to the transmission accumulator 116 via the OAR data path as shown in FIG. 1a. In one embodiment of the invention, the backplane manager 112 is an FPGA. In an alternate embodiment of the invention, the backplane manager 112 is an ASIC.

The transmit accumulator 116 is a processor that receives packet data from the backplane 114 intended for transmission. The transmit accumulator 116 collects packets from the backplane 114 and organizes them into per-backplane-source, per-priority transmit queues stored in the transmit dual-port memory 118. The transmit accumulator 116 notifies the TXPP 120 when data comprising a packet is stored in the transmit dual-port memory 118 and available for processing. In one embodiment of the invention, the transmit accumulator 116 is an FPGA.

The transmit packet processor 120 retrieves data from the transmit dual-port memory 118 according to a programmable priority scheme. The TXPP 120 extracts network destinations from the data and reassembles packet header forwarding information by removing any packet header modifications that took place in order to route the packet through the device chassis. The TXPP 120 performs sanity checks on packet data to ensure that only those packets intended for transmission are passed on to the MAC 102. Since packets routed through the chassis carry header information pertaining to forwarding within the chassis, this information must be removed and replaced with header forwarding information appropriate for routing over the network. After the proper network header forwarding information is reassembled and the chassis header information is removed, the transmit packet processor 120 forwards the data to the MAC 102 for eventual transmission over the network to the intended address. In one embodiment of the invention, the transmit packet processor 120 is an FPGA. In an alternate embodiment of the invention, the transmit packet processor 120 is an ASIC.

Figure 2:
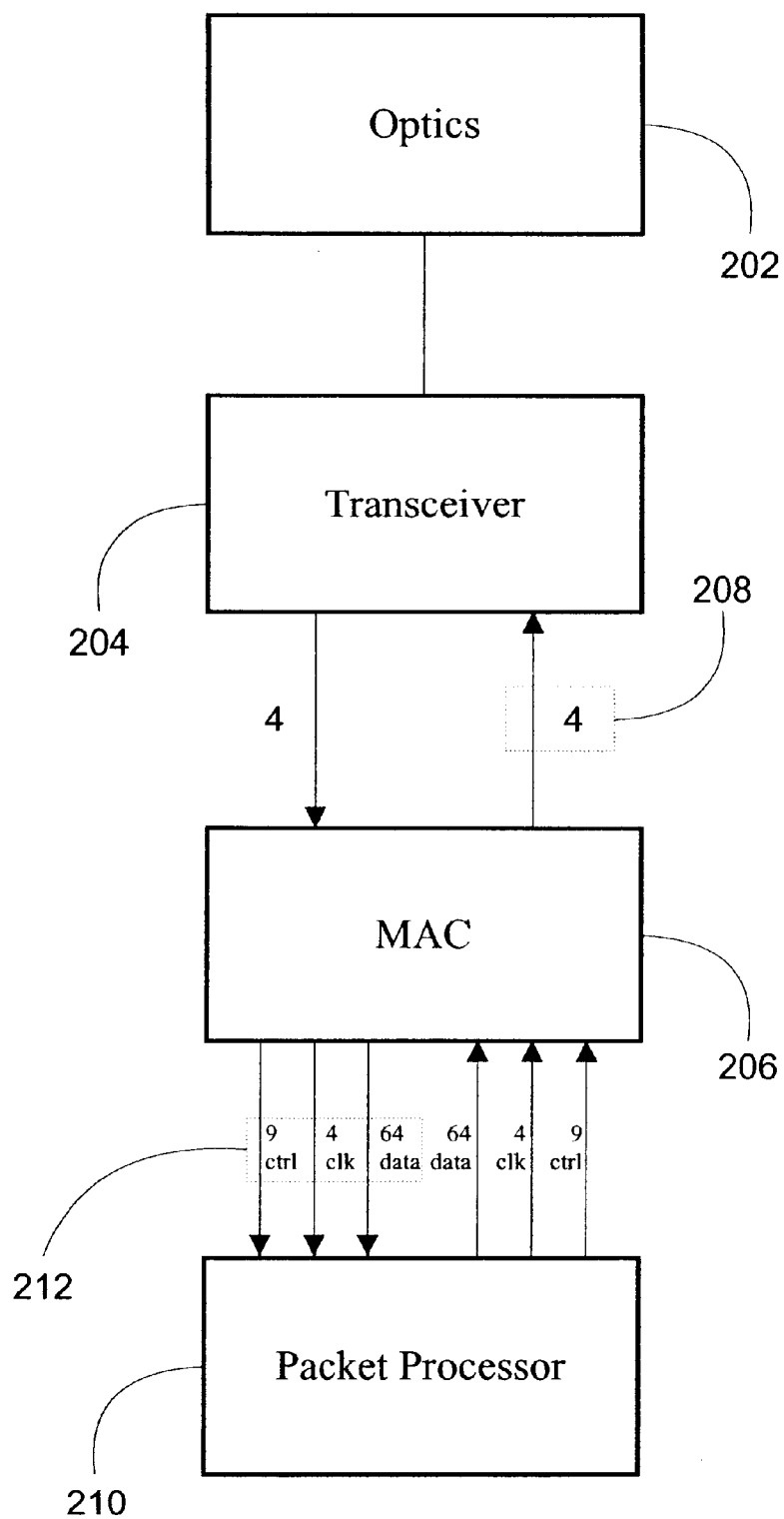
FIG. 2 is a high level flow diagram of a connection of a packet processor component of the present invention to an outside network, in accordance with one embodiment of the present invention.

FIG. 2 presents a high-level schematic of one embodiment of the invention as it connects to a network, e.g., an optical network comprising fiber optic connections. The optics block 202 is the interface through which all network data traffic passes. The optics block 202 contains a transmitter for generating the optical signals to the network when data is received from the transceiver 204. In some embodiments, the transmitter might comprise a laser or a light emitting diode. The optics block 202 also contains a detector for receiving optical data traffic from the network. When optical data is received, a photodetector generates an electrical current that is amplified to level useable by the transceiver 204. The signal is then communicated to the transceiver 204 for further processing.

The transceiver 204 directs the transmission and receipt of signals to and from the optics block 202. The transceiver 204 receives electrical data signals intended for transmission to the MAC 206 and instructs the transmitter in the optics block 202 to generate optical signals corresponding to the electrical data signals. Conversely, the transceiver 204 receives electrical data signals from the optics block 202 and passes these signals to the MAC 206 for processing.

There are many asynchronous boundaries between the various components of the invention. For example, data passes to and from the transceiver 204 and the MAC 206 at a fixed speed. In one embodiment of the invention, the datapath 208 between the transceiver and the MAC 206 operates sending 4 clock signals along with 32 bit DDR data at 156.25 MHz. The datapath 212 between the MAC 206 and the packet processor 210, however, may operate at a different speed. For example, in one embodiment of the present invention, the datapath 212 between the MAC 206 and the packet processor 210 operates sending 4 clock signals along with 64-bit SDR at 66 MHz. Multiple clock signals are sent with the data and used to minimize timing differences between groups of data signals and a clock. In one embodiment of the invention, one clock signal is included per 8 bits of DDR data and one clock signal is included per 16 bits of SDR data. In addition to clock signals, control signals are also sent along with data to indicate packet boundaries and possible error conditions. In one embodiment of the invention, control signals are distributed across 4 clock groups of data.

Those skilled in the art will recognize that an important technique in managing the dataflow between these asynchronous boundaries is the use of FIFO buffers that permit the dataflow to remain synchronized. Given the extremely high rate of data transfer provided by the invention, conventional techniques for clock distribution, such as those known in the art and used in the case of personal computer boards, will not allow reliable capture and transfer of data between components of the invention operating according to different clocks. The invention, therefore, implements source synchronous clocking wherein the clock is sent along with the data.

When the clock arrives at the packet processor 210 from the MAC 206, for example, the clock is exactly in relationship according to the MAC 206, but the packet processor 210 can also capture the data on that clock via a FIFO. Data from the MAC 206 is captured inside a FIFO, which allows the packet processor to synchronize, in the presence of this data, between the source synchronous clock contained in the FIFO data and the clock the packet processor 210 is using at its core.

The invention uses source synchronous clocking in a symmetric manner. For example, data passing from the packet processor 210 to the MAC 206 is also captured in a FIFO to allow the MAC 206 to synchronize, in the presence of the FIFO data, between the source synchronous clock (of the packet processor 210 core) and the clock the MAC 206 is using at its core clock. In an alternative embodiment, the invention also implements differential source synchronous clocking which is known to those skilled in the art. Differential source synchronous clocking works in much the same manner as source synchronous clocking, except that two clock signals are sent with the data instead of one clock signal. The two clock signals, a high and low signal, are used to calculate a more precise approximation of the signal value being transmitted which those skilled in the art will recognize is used to reduce noise and generate more accurate data transmissions.

Figure 3:
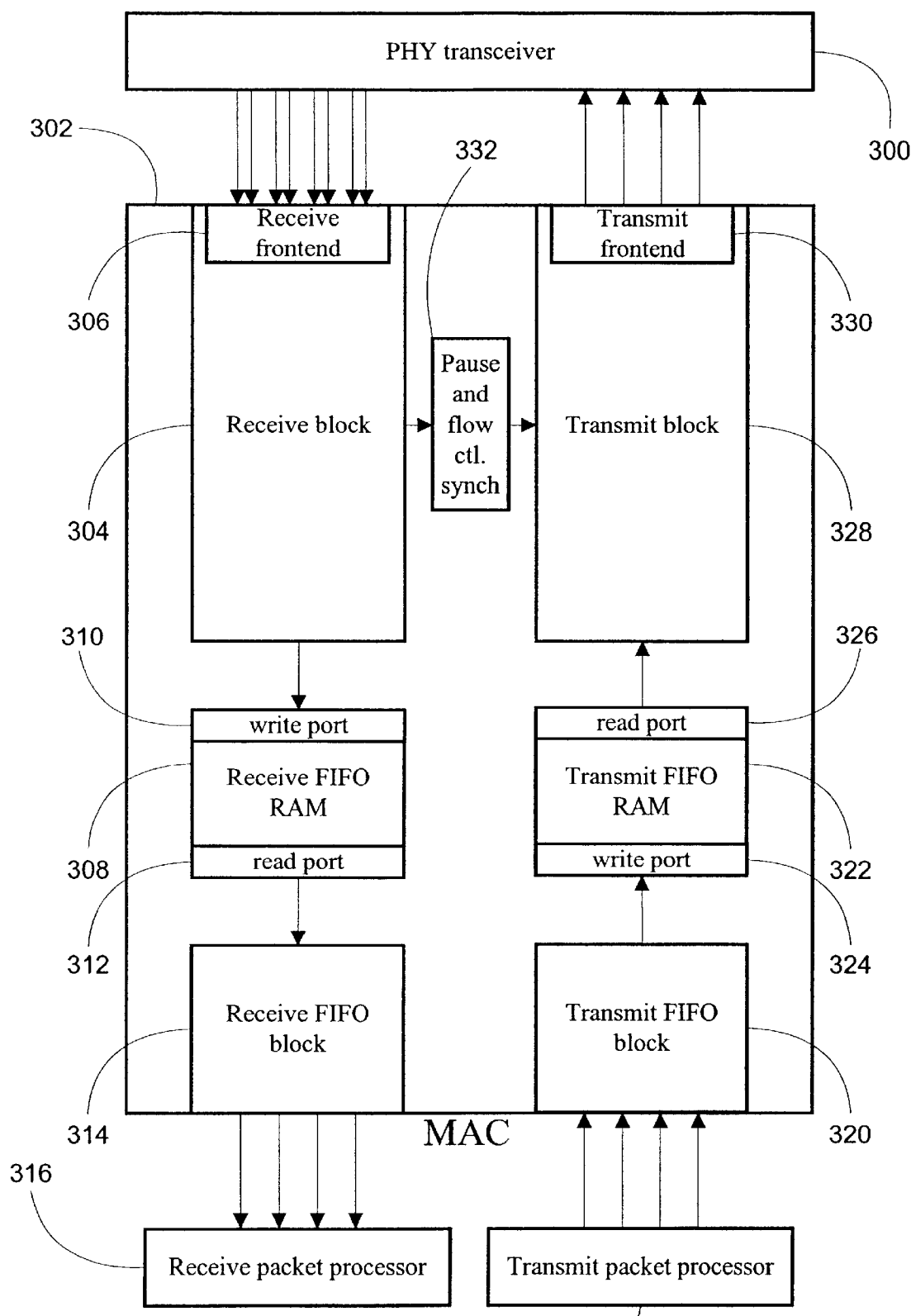
FIG. 3 is a block diagram of receive and transmit packet processors of one embodiment of the present invention.

FIG. 3 is a block diagram depicting one embodiment of the components of the MAC 102 as presented in FIGS. 1 and 1a. Components of the MAC 102 are embodied in the MAC processor chip 302. According to one embodiment of the invention, the MAC chip 302 is an FPGA. In an alternate embodiment of the invention, the MAC chip 302 is an ASIC. The MAC 102 is the interface between the network via the PHY transceiver 300 and the RXPP 104 and TXPP 120 packet processor chips. According to one embodiment of the invention, the MAC 102 communicates directly to the PHY layer transceiver 300 via a DDR interface and with the packet processor chips of the RXPP 104 and the TXPP 120 via an SDR interface.

The PHY transceiver 300 is the component applying signals to the network wire and detecting signals passing through the network wire. According to one preferred embodiment of the invention, the PHY transceiver 300 is a 10 Gigabit Ethernet transceiver transmitting and receiving 32 bit DDR data at 156.25 Mhz. Data received by the PHY transceiver 300 is passed to the receive front end 306 of the MAC 102. The receive front end 306 is an interface that receives data, which is passed to the receive block 304 for further processing. According to one preferred embodiment of the invention, the receive front end 306 receives 32 bit DDR data.

The receive block 304 performs a variety of tasks on data received from the receive front end 306 and is very flexible in operation. The receive block 304 internally converts data received from the receive front end 306 into a format suitable for transmission to the RXPP 104. According to one embodiment of the invention, the receive block converts 32 bit DDR data into 64 bit SDR data for transmission. The receive block 304 may also perform other tasks as required according to various embodiments of the invention such as verifying and extracting XGMII tokens, realigning bytes such that the start of packet ("SOP") token is placed in a "lane zero" position, verifying SOP and EOP framing, detecting giant packets, verifying and optionally stripping packet cyclic redundancy checks, tracking the full suite of RMON statistics, and other useful operations.

The receive block 304 also generates flow control packets via the pause and flow control sync block 332. The receive block 304 operates off of the recovered source synchronous clocks contained in the incoming data packets received from the PHY transceiver 300. Other components of the MAC 102, including the transmit block 328, however, are operating off of an internal core clock generated locally. Although these two clocks are nominally the same frequency, there is some variance since they are not really the same clock and therefore tend to "drift" over time. This difference between the two clocks requires periodic synchronization of the receive block 304 and the transmit block 328 for the purposes of passing flow control messages to generate pause frames and avoid network congestion.

In such a scenario, the receive block 304 receives an incoming message from a remote source (to which the transmit block 328 is sending data) indicating that the remote source is becoming congested and requesting that the transmit block 328 pause transmission for a requested interval. The pause and flow control sync block 332 synchronizes the receive block 304 clock with the transmit block 328 clock to permit the receive block 304 to pass the pause frame request to the transmit block 328 and reduce the network congestion. Conversely, in the unlikely event that the receive FIFO RAM 308 becomes congested, the pause and flow control sync block 332 would synchronize the two clocks to permit the receive block 304 to instruct the transmit block 328 to start issuing flow control pause frames to a remote sender to reduce network congestion in the MAC 102.

The receive block 304 passes processed data to the receive FIFO RAM 308 via the write port 310 of the receive FIFO RAM 308 which enables the receive block 304 to process the next packet without waiting for the receive FIFO block 314 to become available. The receive FIFO RAM 308 is a two-port memory having a write port 310 that accepts incoming data from the receive block 304 and a read port 312 that transmits data stored in the receive FIFO RAM 308 to the receive FIFO block 314. The write port 310 and the read port 312 operate independently of each other thus permitting more efficient use of the receive FIFO RAM 308 by the receive block 304 and the receive FIFO block 314.

The FIFO RAM 308 further permits data flow though the asynchronous boundary. In one embodiment of the invention, the receive block 304 operates at a different speed than the receive FIFO block 314. Thus, the FIFO RAM 308 acts as a bridge, allowing data flow to be synchronized between these asynchronous components. For example, in the Foundry BigIron switch, the receive block 304 operates at a 156.25 MHz clock recovered from the arriving data and the FIFO block 314 operates on a locally generated 156.25 MHz clock that differs slightly and drifts in phase relationship over time.

To further reduce processing time, the receive block 304 starts streaming data into the receive FIFO RAM 308 when the receive block detects the start of a packet and stops streaming data into the receive FIFO RAM 308 when the receive block 304 detects the end of the packet. All of the packet processing components of the invention stream data into FIFOs in this manner which greatly reduces processing time since components are not required to wait until an entire packet is finished processing to start copying the packet into a FIFO.

The receive FIFO block 314 reads data stored in the receive FIFO RAM 308 via the read port 312. The receive FIFO block 314 also notifies the RXPP 104 that packet data is contained in the receive FIFO RAM 308 and available for transmission. This data is transmitted to the RXPP 104 for further processing. According to one embodiment of the invention, the receive block FIFO 314 transmits 64 bit SDR data to the RXPP 104.

In addition to the receive pipeline of the MAC 102 as set forth above, the MAC 102 also contains a transmit pipeline that operates in a similar fashion with similar flexibility. The transmit FIFO block 320 is the interface of the MAC 102 that receives data from the TXPP 120. According to one embodiment of the invention, the transmit FIFO block 320 receives 64 bit SDR data from the TXPP 120.

The transmit FIFO block 320 streams received data to the transmit FIFO RAM 322 via the write port 324 of the transmit FIFO RAM 322, enabling the transmit FIFO block 320 to process the next incoming packet without waiting for the transmit block 328 to become available. The transmit FIFO RAM 322 is a two-port memory having a write port 324 that accepts incoming data from the transmit FIFO block 320 and a read port 326 that transmits data stored in the transmit FIFO RAM 322 to the transmit block 328. Similar to the two-port memory comprising the receive FIFO RAM 308, the write port 324 and the read port 326 of the transmit FIFO RAM 322 operate independently of each other, thus permitting pipelining and more efficient use of the transmit FIFO RAM 322 by the transmit FIFO block 320 and the transmit block 328.

The transmit block 328 reads data stored in the transmit FIFO RAM 322 via the read port 326. Similar to the receive block 304, the transmit block 328 performs a variety of tasks and is very flexible in operation. The transmit block 328 internally converts data received from TXPP 120 into a format suitable for transmission to the PHY transceiver 300. According to one embodiment of the invention, the transmit block converts 64 bit SDR data into 32 bit DDR data for transmission. The transmit FIFO RAM 322 facilitates this conversion by bridging the asynchronous boundary between the transmit block 328 and the transmit FIFO block 320.

The transmit block performs other tasks as required according to embodiments of the invention, such as generating flow control packets to the PHY side sender at the request of the TXPP 120 (and in addition to internal flow control requests generated by the receive block 304 via the pause and flow control sync 332 when the receive FIFO RAM 308 is full) to avoid network congestion, calculating and optionally appending a cyclic redundancy check to a packet, determining and inserting XGMII tokens, and tracking the full suite of RMON statistics. In one embodiment of the invention, the transmit block 328 stores data in a programmable FIFO buffer used for data rate matching which allows the MAC 102 to connect to a packet processor that is receiving data slower than line rate.

The transmit block 328 passes data processed for to the transmit front end 330 thus enabling the transmit block 328 to begin processing the next packet. The transmit front end 330 is an interface that receives data from the transmit block 328 and passes this data to the PHY transceiver 300 for transmission over the network. According to one preferred embodiment of the invention, the transmit front end 330 transmits 32 bit DDR data to the PHY transceiver 300.

Figure 4:
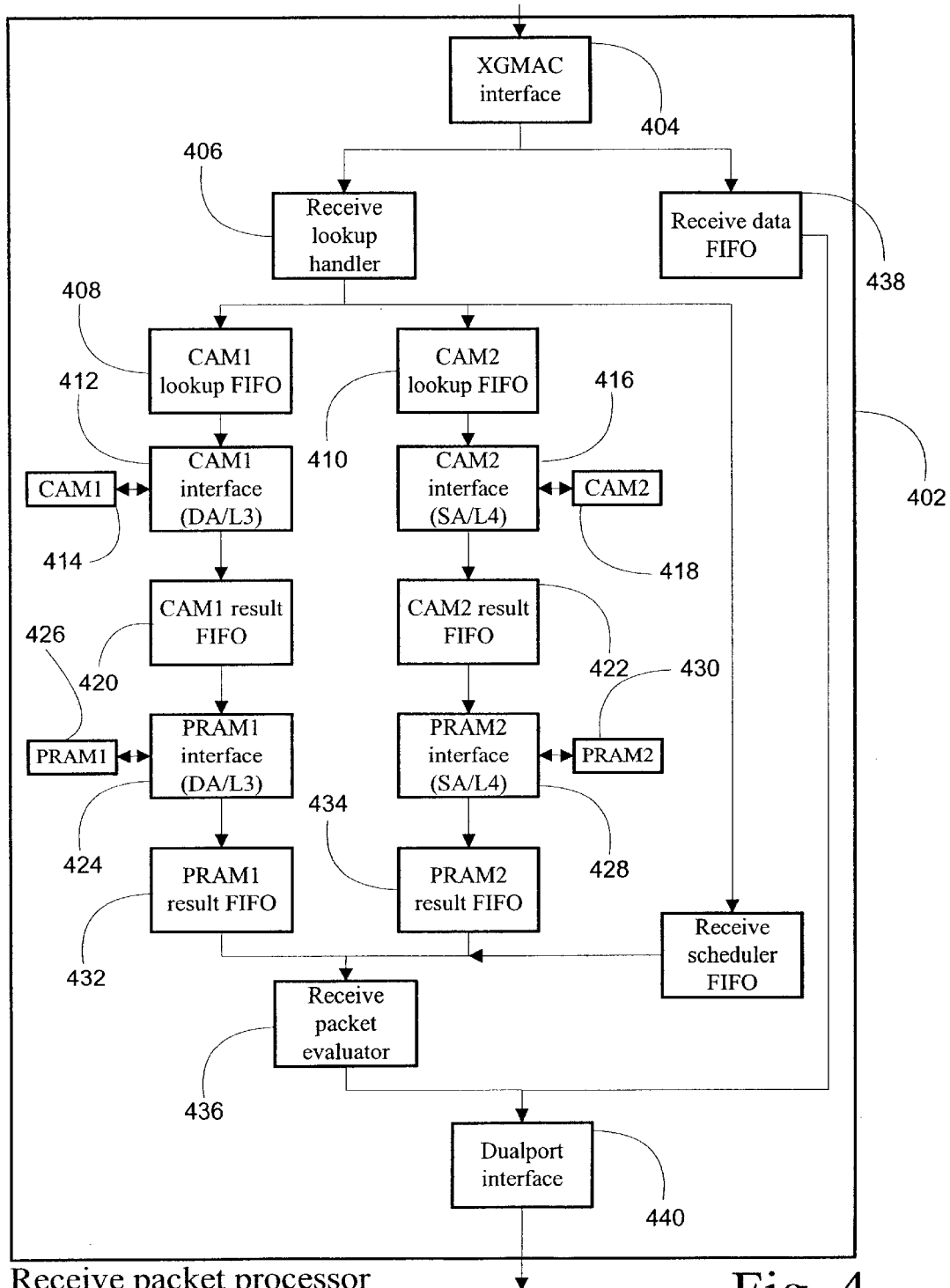
FIG. 4 is a block diagram of a receive packet processor in accordance with one embodiment of the present invention.

Building on the illustration presented in FIG. 1, FIG. 4 presents a block diagram depicting one embodiment of the components of the RXPP 104. The RXPP 402 is responsible for packet classification, performing CAM and PRAM lookups, generating hardware packet headers used for internally forwarding packets within the chassis of the network device, such as between blades, and for preparing packet modifications. Components of the RXPP 104 are embodied in the RXPP chip 402. According to one preferred embodiment of the invention, the RXPP chip 402 comprises an FPGA. In an alternate embodiment of the invention, the RXPP chip 402 comprises an ASIC.

The XGMAC 404 interface is responsible for requesting data for the RXPP 402 from the MAC 102. When the receive lookup handler 406 is available to parse additional data and the receive data FIFO 438 is available to store additional data, the XGMAC 404 instructs the MAC 102 to begin streaming packet data into the RXPP 104. The XGMAC interface 404 is connected to the MAC 102 and receives data for processing by the RXPP 104. The XGMAC interface 404 also acts as an asynchronous boundary, writing source-synchronous 64-bit data from the MAC 102 in a small internal FIFO, then sending the synchronized data at 66 MHz in 256-bit chunks for subsequent processing.

The XGMAC interface 404 sends synchronized data as it is received from the MAC 102 to the receive data FIFO 438, where it is held until CAM and PRAM lookups are performed. The receive data FIFO 438 thus acts as a delay buffer until packet processing is completed and the packet data can start being written by the dual-port interface 440 into the receive dual-port memory 110.

While all data related to a packet is streamed to the receive data FIFO 438, the XGMAC interface 404 also parses the incoming data as it is received from the MAC 102 and streams only the packet header information to the receive lookup handler 406 where it will be used to perform CAM and PRAM lookups.

The receive lookup handler 406 performs sanity checks on the packet data as it is received from the XGMAC interface 404. For example, the receive lookup handler 406 identifies valid packet contexts by identifying consistent start-of-packet and end-of-packet boundaries. In this respect, the receive lookup handler 406 also monitors a bad packet control signal from the MAC 102 indicating a data fault. If a data fault is detected, the receive lookup handler 406 discards the header data from the bad packet and also flushes any associated data already stored in the receive data FIFO 438 related to the bad packet. In one embodiment of the invention, if packet processing has already started, a data fault flag indicating a bad packet is stored in the receive data FIFO 438. The dual port interface 440 will later discard the packet when the data fault flag is retrieved from the receive data FIFO 438.

The receive lookup handler 406 strips VLAN tags, compares the packet MAC destination address against the port MAC address, performs IPv4 TOS field lookups as required, and also checks the protocol used to encode the packet. Examples of encoding protocols include IP, IP ARP, IPv4, IPv6, 802.3, IPX RAW, IPX LLC, IPX 8137, IPX SNAP, Appletalk, Appletalk ARP, NetBios, IP SNAP, and IP ARP SNAP. This information will be used to assemble an internal hardware packet header to be appended to the packet for use in forwarding the data internally throughout the chassis of the network switch. This additional information is passed from the receive lookup handler 406 to the RX scheduler FIFO 407. The RX scheduler FIFO 407 holds this information until the CAM and PRAM lookups are completed on the destination and source addresses extracted by the receive lookup handler 406 from the packet header.

Based upon the information extracted, the receive lookup handler 406 forms the CAM lookups and builds part of the hardware packet header for internally forwarding the packet through the chassis of the network device. The internal state of the receive lookup handler 406 containing this information is then split into two CAM lookup FIFOs 408 and 410, which are memory buffers that permit the receive lookup handler 406 to start processing the next packet received from the XGMAC interface 404. Packet processing is thus pipelined, allowing the receive lookup processor 406 to continue processing packets without waiting for either the CAM1 interface 412 or the CAM2 interface 410 to become available. Information relating to the destination address of the packet and other protocol fields from the header related to Layer 3 are passed to CAM1 lookup FIFO 408. Information relating to the source address of the packet and other protocol fields from the header related to Layer 4 are passed to CAM2 lookup FIFO 410. In an alternate embodiment of the invention, the two pipelines are merged into a single pipeline containing a single CAM interface and a single FIFO interface for lookups.

The CAM1 interface 412 becomes available, retrieves the data stored in the CAM1 lookup FIFO 408, and submits requests regarding this data to the external ternary CAM1 414 memory bank that contains a data array of values against which to perform lookups. The CAM1 interface 412 is also pipelined and supports dispatching lookups for multiple packets to the external ternary CAM1 414 memory bank since it takes longer than four clocks for the external CAM1 414 to respond.

If the lookup generates a match against an entry in the CAM1 414 array, additional forwarding information exists in the PRAM1 426 memory bank regarding the disposition of the packet. Forwarding information might include details such as the destination port of the packet, the port mirror requirement, the packet type, VLAN handling information, packet prioritization data, multicast group membership, replacement destination MAC addresses (used in network routing), and/or other similar packet data known in the art. The CAM1 414 array entry also contains a link to the memory address of the additional forwarding information stored in the PRAM1 426 memory bank. This link is stored in the CAM1 result FIFO 420 until the PRAM1 interface 424 is available to perform lookups.

Similarly, the CAM2 interface 416 retrieves source address data from the CAM2 lookup FIFO 410, performs lookups by submitting requests to the external ternary CAM2 memory bank 418, and stores the results of these lookups in the CAM2 result FIFO 422 until the PRAM2 interface 428 is available to perform lookups. According to one embodiment of the invention, the CAM2 interface 416 operates in parallel with the CAM1 interface 412 to allow CAM lookup operations to complete faster.

The PRAM1 interface 424 retrieves the data associated with the successful CAM1 interface 412 lookups from the CAM1 result FIFO 420. The PRAM1 interface 424 extracts from this data the link to the memory address of the additional forwarding information stored in the PRAM1 426 memory bank. PRAM1 interface 424 lookup results are stored in the PRAM1 result FIFO so work can immediately start on the next packet. According to one embodiment, PRAM lookups for a packet take 3 clocks. Similarly, and preferably in parallel, the PRAM2 interface 428 retrieves data associated with successful CAM2 interface 416 source address lookups from the CAM2 result FIFO 422, performs lookups to obtain additional forwarding information stored in the PRAM2 430 memory bank, and stores the results in the PRAM2 result FIFO 434.

The receive packet evaluator 436 extracts the data from the PRAM1 result FIFO 432, PRAM2 result FIFO 434, and the RX scheduler FIFO 407. The receive packet evaluator 436 uses this information to construct the internal hardware header used to forward a packet through the chassis with the most advanced forwarding in this aspect permitting total destination address/VLAN/TOS replacement and packet header modification to support hardware packet routing. In one embodiment of the invention, the internal hardware header comprises sixteen bytes. The receive packet evaluator 436 also determines the priority level of the packet according to the CAM and PRAM lookups and may optionally adjust the packet priority according to whether the packet is VLAN tagged or contains IPv4 TOS fields. The priority level is inserted into the internal hardware header of the packet.

The receive packet evaluator 436 notifies the dual-port interface 440 that processing is complete and passes the new internal hardware header to the dual-port interface 440 for integration with the packet data stored in the receive data FIFO 438. The dual-port interface 440 reads from the receive data FIFO 438, applying packet modifications to incorporate the new hardware packet header and stores this packet data in the receive dual-port memory 110. The dual-port interface 440 also detects the end of packet ("EOP") signal and issues a receive packet processing completion notification to the backplane manager 112 so the backplane manager 112 will know to retrieve the packet. If a packet is flagged as bad (for example, an invalid cyclic redundancy check) the buffer is instead immediately recycled for the next packet and the current packet is deleted.

Figure 5:
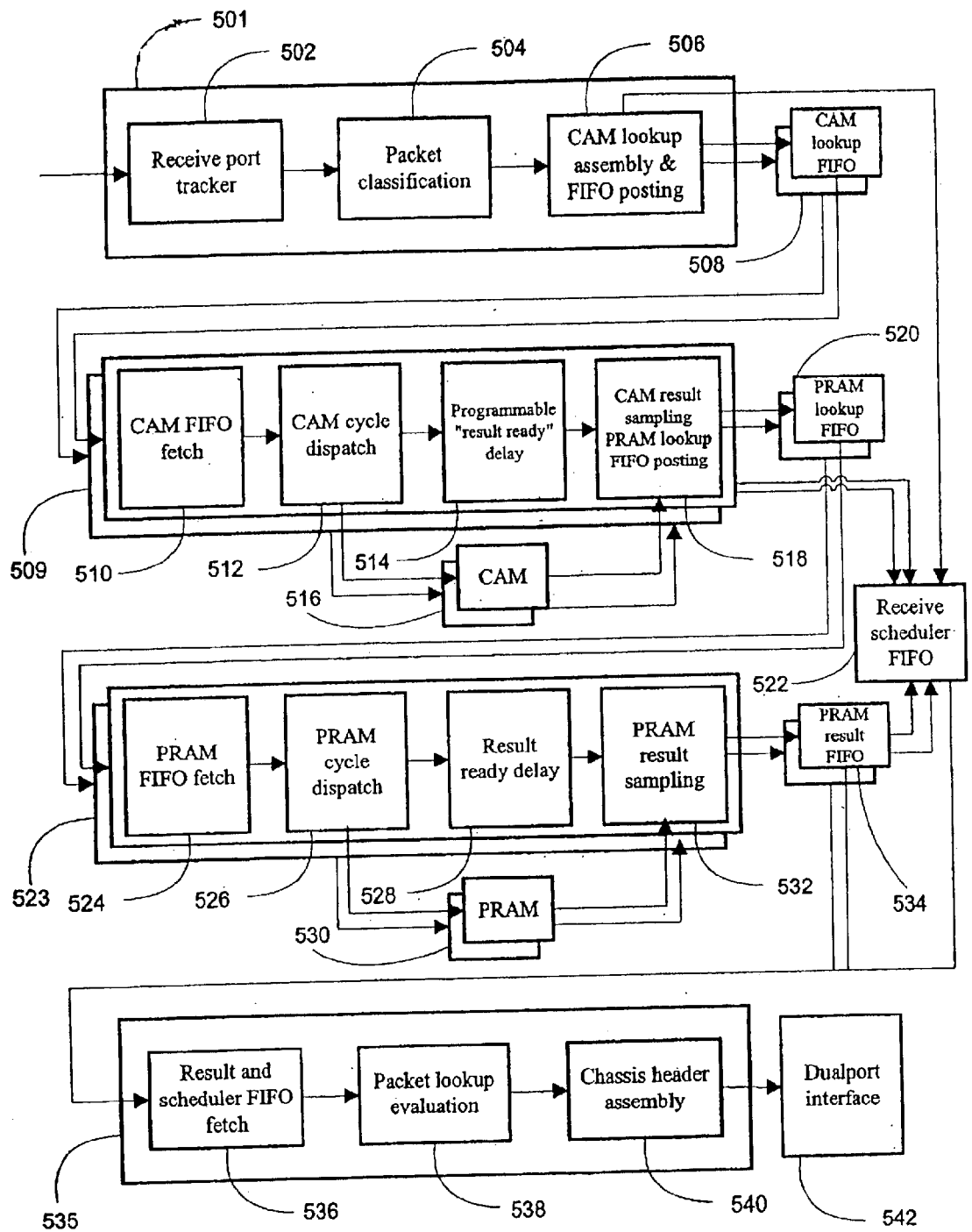
FIG. 5 is a flow diagram showing the data flow in the receive packet processor of FIG. 4 in accordance with one embodiment of the present invention.

FIG. 5 presents a block diagram depicting the operations of the RXPP 402 presented in FIG. 4 more discretely. Data flow commences with the receive lookup handler 501 receiving packet data from the XGMAC interface 404 as illustrated in FIG. 4. The XGMAC interface 404 parses data received from the MAC 102 and sends only the packet header information to the receive lookup handler 501.

The receive port tracker 502 examines the port information contained in the packet header to ensure that any VLAN information tags contained in the packet header will be accepted at the destination address port. If the destination address port is not configured to accept the packet header VLAN information or lack thereof, then the receive lookup handler 501 either sets an error bit in the packet header if debugging is supported or the packet is discarded. Alternatively, the receive lookup handler 501 will strip the VLAN tag from its field in the packet and store the VLAN tag in the internal hardware packet header for future use.

The receive lookup handler 501 checks the protocol used to encode the packet and classifies the packet accordingly in block 504. Examples of encoding protocols include IP, IP ARP, IPv4, IPv6, 802.3, IPX RAW, IPX LLC, IPX 8137, IPX SNAP, Appletalk, Appletalk ARP, NetBios, IP SNAP, and IP ARP SNAP. This information is used to assemble an internal hardware packet header to be appended to the packet for use in forwarding the data internally throughout the chassis of the switch. This additional information is passed from the receive lookup handler 501 to the RX scheduler FIFO 522. The RX scheduler FIFO 522 holds this information until the CAM and PRAM lookups are completed on the destination and source addresses extracted by the receive lookup handler 501 from the packet header.

The receive lookup handler 501 also forms the CAM lookups and builds part of the hardware packet header in block 506. The receive lookup handler 501 extracts source and destination address information from the packet header for use in the CAM lookups. The internal state of the receive lookup processor 501 containing this information is then passed to the CAM lookup FIFO 508, which is a memory buffer that permits the receive lookup processor 501 to start processing the next packet received from the XGMAC interface 404. Packet processing is thus pipelined allowing the receive lookup processor 501 to continue efficiently processing packets without waiting for the CAM interface 509 to become available.

When the CAM interface 509 becomes available, it fetches the address data stored in the CAM lookup FIFO 508 as shown in block 510. The CAM interface 509 dispatches requests regarding data in block 512 to the external ternary CAM memory 516 that contains a data array of values against which to perform lookups. The CAM interface 509 is pipelined and supports cycling lookups for multiple packets to the external ternary CAM 516 memory since it takes longer than four clocks for the external CAM 516 to respond. Block 514 illustrates a programmable delay incorporated into the CAM interface 509 pipeline that compensates for this delay while the CAM lookup is being performed.

If the lookup generates a match against an entry in the CAM array 516, additional forwarding information regarding disposition of the packet is available in the PRAM memory 530. Forwarding information might include details such as the destination port of the packet, the port mirror requirement, the packet type, VLAN handling information, packet prioritization data, multicast group membership, and/ or other similar packet data known in the art. The CAM array 516 entry also contains a link to the memory address of the additional forwarding information stored in the PRAM memory 530. This link is returned by the CAM memory 516 as shown in block 518 and stored in the PRAM lookup FIFO 520 until the PRAM interface 523 is available to perform lookups.

When the PRAM interface 523 becomes available, it fetches the link to the address in the PRAM memory 530 that is stored in the PRAM lookup FIFO 520 as shown in block 524. In block 526, the PRAM interface 523 dispatches requests to retrieve the additional forwarding information for the packet to the external PRAM memory 530. The PRAM interface 523 is pipelined and supports cycling lookups for multiple packets to the external PRAM memory 530 since it takes multiple clocks for the external PRAM memory 530 to return results from a lookup. Block 528 illustrates a programmable delay incorporated into the PRAM interface 523 pipeline that compensates for this delay while the PRAM lookup is being performed. The external PRAM 530 returns the additional forwarding information in block 532 and these results are stored in the PRAM result FIFO 534 until the receive packet evaluator 535 is available.

In block 536, the receive packet evaluator 535 fetches data from the PRAM result FIFO 534 and the receive scheduler FIFO 522. The receive packet evaluator 535 evaluates this information in block 538 and uses the results to construct the internal hardware packet header in block 540. The internal hardware packet header is used to forward the packet through the chassis among other blades inserted into slots on the backplane. The most advanced forwarding in this aspect permits total destination address/VLAN/TOS replacement and packet header modification to support hardware packet routing. In one embodiment of the invention, the internal hardware header comprises sixteen bytes.

The receive packet evaluator 535 notifies the dual-port interface 542 that processing is complete and passes the new internal hardware header to the dual-port interface 542 for integration with the packet data stored in the receive data FIFO 438, as illustrated in FIG. 4. The dual-port interface 542 reads from the receive data FIFO 438 applying packet modifications to incorporate the new hardware packet header for internally forwarding the packet through the chassis of the switch and stores this packet data in the receive dual-port memory 110. The receive dual-port memory is organized as four large FIFOs corresponding to four exemplary priority levels. The dual-port interface 440 also detects the end of packet ("EOP") and issues a receive packet processing completion notification to the backplane manager 112 so the backplane manager 112 will know to retrieve the packet. If a packet is flagged as bad (for example, an invalid cyclic redundancy check) the packet is deleted and the buffer is recycled for the next packet.

Figure 6:
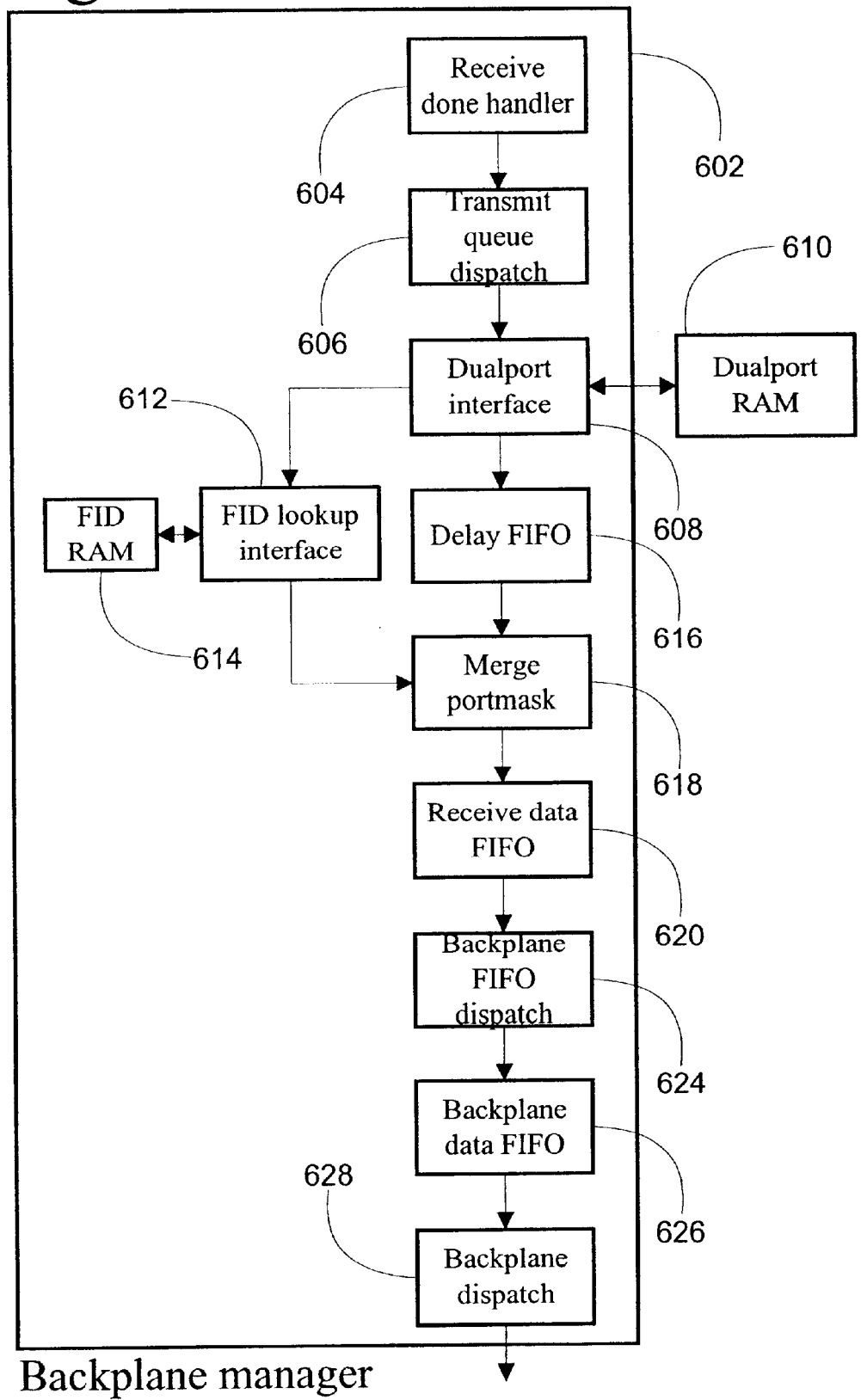
FIG. 6 is a block diagram of a backplane manager in accordance with one embodiment of the present invention.

Transport within a blade continues with FIG. 6, which presents a block diagram depicting the components of the backplane manager 112 as illustrated in FIG. 1. Components of the backplane manager 602 are embodied in the backplane manager chip. According to a embodiment of the invention, the backplane manager chip 602 comprises an FPGA.

The backplane manager 602 is responsible for retrieving data from the receive dual-port memory 610, determining backplane destinations for this data, and sending this data to those destinations. The backplane manager 112 also manages four large FIFOs stored in the external dual-port memory 610. These FIFOs store data according to priority levels by which the data is to be processed by the backplane manager 112.

The receive done handler 604 receives EOP information from the receive packet processor 104, including information regarding packet length and packet priority. This information is used to assist the receive done handler 604 in tracking receive dual-port memory 110 utilization for the four priority levels and scheduling packets for dispatch by the transmit queue dispatch 606. If the backplane manager 602 or the receive dual-port memory FIFOs 610 are running low on resources, the receive done handler 604 sends a throttle control back to the receive packet processor 104.

The transmit queue dispatch 606 is responsible for ordered packet dispatch from the four priority levels of the receive dual-port memory FIFOs 610. The transmit queue dispatch 606 receives packet length and priority information from the receive done handler 604 and uses this information to schedule packet retrieval from the dual-port RAM 610 by the dual-port interface 608 according to prioritization algorithms contained in the transmit queue dispatch 606.

According to one embodiment of the invention, absolute priority is used with higher priority packets being unconditionally transmitted before any packets of lower priority. Absolute priority, however, is not always desirable. In another embodiment, some fraction of the transmission bandwidth available to the backplane manager 112 is dedicated to lower priority packet transmission regardless of whether higher priority packets are also pending because packets are often received by the invention faster than they can be transmitted. If some bandwidth were not allocated to lower priority packets in this manner, a bottleneck might be created with lower priority packets not being transmitted due to higher priority packets monopolizing all available transmission bandwidth. Packets are thus scheduled and posted for use by the transmit queue dispatch 606.

The dual-port interface 608 fetches data from the receive dual-port memory 610 based on instructions received by the transmit queue dispatch 606. At the start-of-packet boundary, the dual-port interface 608 extracts a forwarding identifier ("FID") from the packet and sends the FID to the FID lookup interface 612. The FID is an abstract chassis/system wide number used to forward packets. Each packet type has a FID to instruct the blade how to handle a given type of packet. This allows each blade in the chassis to look at the FID separately to decide how to individually forward the packet.

The FID lookup interface 612 translates the FID received from the dual-port interface 608 into a port mask by performing a lookup against addresses stored in the external FID RAM 614. The port mask is a multi-bit field representing a port on the blade and also other possible backplane slot destinations in the device chassis. According to one embodiment, the port mask is an 8-bit field representing a 10 Gigabit Ethernet port on the blade and seven other possible backplane slot destinations.

The FID lookup takes a number of clock cycles to complete during which time read data is posted to the delay FIFO 616 by the dual-port interface 608. According to one embodiment of the invention, the FID lookup by the FID lookup interface 612 into the external FID RAM 614 requires a delay of six clocks to complete in order to resume processing the data.

The FID lookup is completes and the results are passed from the FID lookup interface 612 to the merge port mask 618. Read data stored in the delay FIFO 616 is also passed to the merge port mask 618. The merge port mask 618 integrates the read data with the appropriate FID lookup port mask result and other port masks as set forth below to ensure that the data is transmitted to all intended destinations.

The merge port mask 618 takes the FID lookup port mask result and combines it with CPU and monitor information stored in configuration registers of the backplane manager. For example, a FID indicates a physical destination or possibly a list of destinations, but the receive packet processor 104 might have determined that the CPU also needs a copy of the data and therefore sets the CPU flag for combination with the FID lookup port mask by the merge port mask 618. Alternatively, when a packet needs to be sent to a monitor port for network debugging or similar purpose, the monitor port mask is combined with the FID port mask. The merge port mask 618 thus generates a "qualified" port mask indicating all destinations for which the packet data is intended.

The merge port mask 618 may also apply source port suppression. In certain situations, the blade that receives the data packet is listed as part of a FID port mask; source port suppression conditionally prevents the blade from retransmitting packets it just received. For example, this might occur in a broadcast situation where packets with unknown addresses are sent to all ports. Once all port mask data is combined with packet data, the merge port mask 618 stores the final result in the receive data FIFO 620 enabling the merge port mask 618 to process the next packet without waiting for the backplane FIFO dispatch 624 to become available.

The backplane FIFO dispatch 624 reads data from the receive data FIFO 620, duplicating the data for each destination indicated in the qualified port mask. The backplane FIFO dispatch 624 restructures the data into a format required by the backplane, generates backplane state and slot information, and posts the results into the backplane data FIFO 626. The backplane data FIFO 626 also acts as an asynchronous boundary between the backplane manager 602 core clock and the actual backplane clock. By posting the results in the backplane data FIFO 626, the backplane FIFO dispatch 624 can process the next packet without waiting for the backplane dispatch 628 to become available. In one embodiment of the invention, data posted to the backplane data FIFO 626 is equivalent to two backplane transfers since the backplane manager runs at approximately one-half the clock speed of the backplane interface 114.

The backplane dispatch 628 reads data from the backplane data FIFO 626 and outputs the data to the backplane via the backplane interface 114. According to one embodiment, the backplane dispatch 628 reads data from the backplane data FIFO 626 suitable for more than one transfer because the ratio of the backplane interface 114 clock speed and the clock speed of the backplane manager 602 is not identical. In such an embodiment, the backplane dispatch 628 reads the number of transfers from the backplane data FIFO 626 that fully utilizes the transmission capacity of the backplane interface 114. For example, if the clock speed of the backplane interface 114 is double that of the backplane manager 602, then the backplane dispatch 628 will read two transfers from the backplane data FIFO.

The backplane dispatch 628 also monitors backplane status and directs backplane transmission rates since it is possible for a backplane slot destination to become congested or otherwise unavailable. For example, if a plurality of blades comprising a single chassis are devoting all of their transmission capacities to a single blade, then they may overload the destination blade. Such a case might occur when two blades both transmit at 8 Gbps to a single destination blade that, according to the capacity of a backplane slot, can only receive 8 Gbps it total. The two blades would have to throttle back transmissions to the destination blade to 4 Gbps to avoid congestion.

Figure 7:
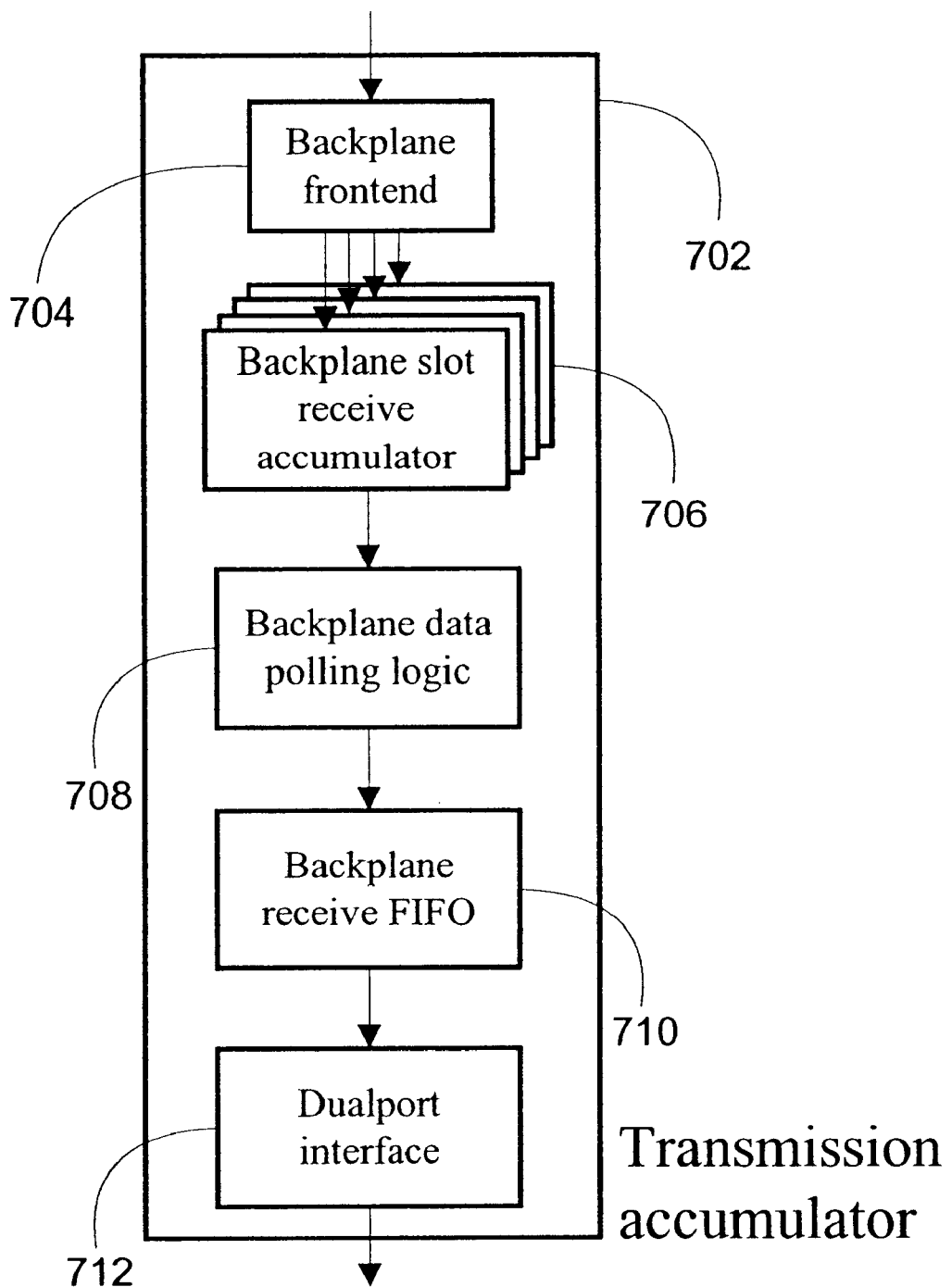
FIG. 7 is a flow diagram showing the data flow in a transmission accumulator in accordance with one embodiment of the present invention.

Data is received from the backplane by the transmission accumulator 116 as presented in FIG. 1. Turning to FIG. 7, the transmission accumulator 116 collects packets from the backplane and organizes them into per-source, per priority transmit FIFOs stored in the transmit dual-port memory 118. Components of the transmission accumulator are embodied in the transmission accumulator chip 702. According to one embodiment of the invention, the transmission accumulator chip 702 comprises an FPGA.

Data is received from the backplane by the backplane front end 704. The backplane front end passes received data to the backplane slot receive accumulator 706. The backplane slot receive accumulator 706 is divided into a series of equal storage structures or memory buffers, with one buffer allocated for each slot or source on the chassis of the device. According to one embodiment of the invention, the backplane slot receive accumulator 706 is divided into eight buffers for receipt of data.

When a particular quantity of data is received into one of the backplane slot receive accumulator 706 buffers, the backplane slot receive accumulator 706 notifies the backplane data polling logic 708 to indicate the buffer and priority of the data being stored. In one embodiment of the invention, the backplane slot receive accumulator 706 waits to notify the backplane data polling logic 708 until 32 bytes of data have been received in a bucket and transfers between the two components thus comprise 32 bytes. If the backplane slot receive accumulator 706 is full, then the transmission accumulator is congested and no longer accepts data until the congestion is relieved.

The backplane data polling logic 708 reads data from the backplane slot receive accumulator 706 and organizes data according to source and priority. If packets are aborted from the backplane, the backplane data polling logic 708 deletes the packet in order to avoid propagation of the packet to the TXPP 120.

The backplane data polling logic 708 processes the data and the final result is stored in the backplane receive FIFO 710, enabling the backplane data polling logic 708 to process the next packet without waiting for the dual-port interface 712 to become available. The backplane receive FIFO 710 also permits dataflow through the asynchronous boundary between the backplane data polling logic block 708 and the dual-port interface 712.

The dual-port interface 712 reads data from the backplane receive FIFO 710 and stores this packet data in the transmit dual-port memory 118. The dual-port interface 712 also detects valid end-of-packet ("EOP") indications and notifies the TXPP 120 via transmission of an EOP message that a packet is available in the transmit dual-port memory 118. The transmit dual-port memory 118 also comprises a series of FIFOs similar to the receive dual-port memory 110. Instead of only four total FIFOs, however, the transmit dual-port memory 118 has four FIFOs for each buffer of the backplane slot accumulator 706, thereby comprising 28 FIFOs for these buffers, plus an additional four FIFOs for the OAR path, yielding a total of 32 FIFOs.

Figure 8:
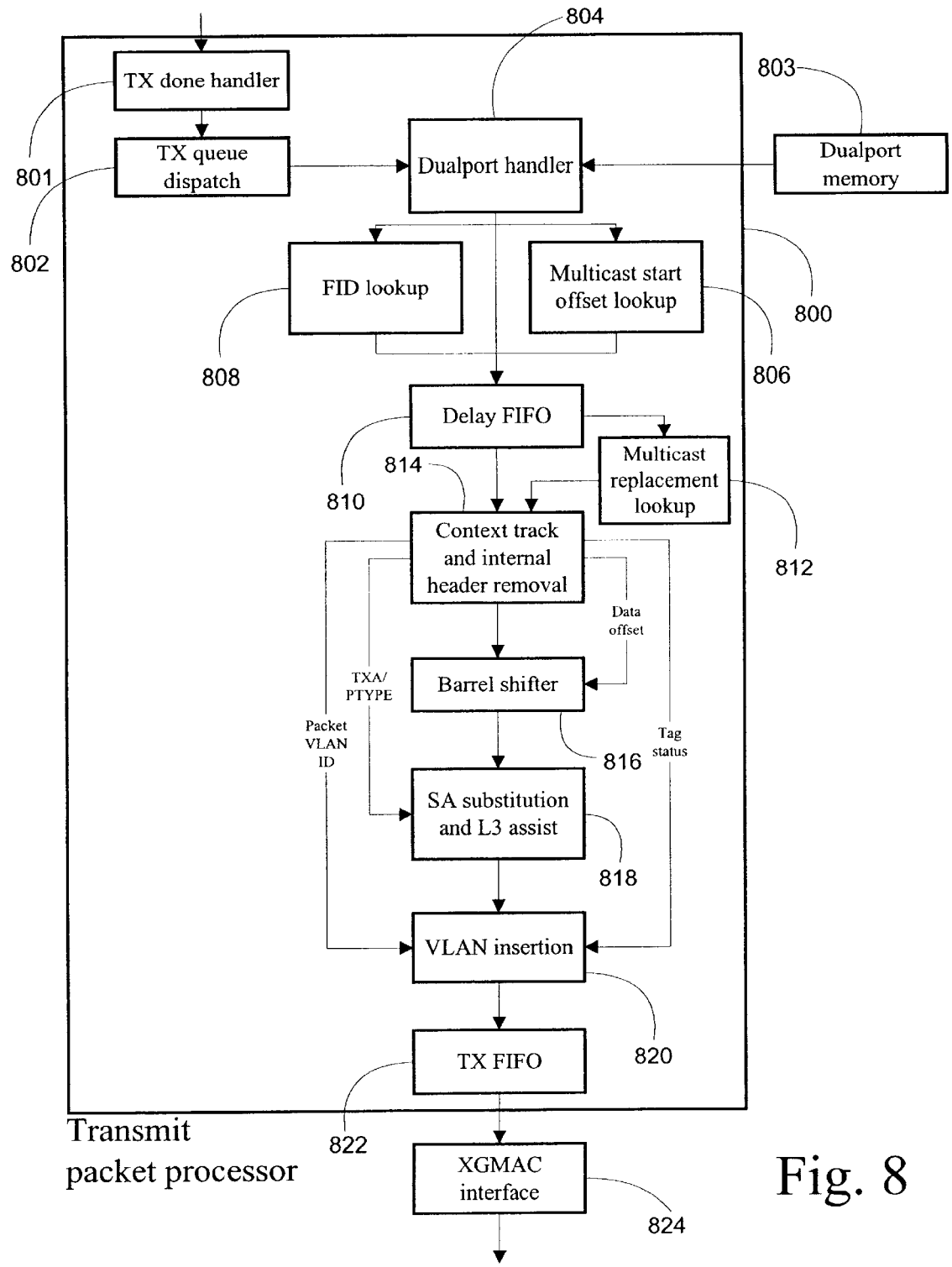
FIG. 8 is a block diagram of a transmit packet processor component in accordance with one embodiment of the present invention.

Transmission continues in FIG. 8, which depicts a block diagram of the components of the transmit packet processor 120 as illustrated in FIG. 1a. Components of the TXPP 120 are embodied in the TXPP chip 800. According to an embodiment of the invention, the TXPP chip 800 comprises an FPGA. The TXPP 800 is responsible for retrieving data from the transmit dual-port memory 803, determining network destinations for this data and sending data to identified destinations. The TXPP 120 strips hardware header forwarding information used to route packets throughout the chassis of the switch and replaces this information with header forwarding information necessary to route packets over the network. The TXPP 120 also manages the FIFOs priority queues stored in the transmit dual-port memory 803. These FIFOs store data according to priority levels by which the data is to be processed by the TXPP 800.

The transmit done handler 801 receives EOP information from the TX accumulator 116, including information regarding packet length and packet priority. This information is used to assist the transmit done handler 801 in tracking transmit dual-port memory 803 utilization for the four priority levels and scheduling packets for dispatch in the transmit queue dispatch 802. The transmit done handler 801 notifies the transmit queue dispatch 802 regarding packet availability and priority.

The transmit queue dispatch 802 is responsible for ordered packet retrieval and dispatch from the four priority levels of the transmit dual-port memory 803 FIFOs. According to one embodiment of the invention, absolute priority is used with higher priority packets being unconditionally transmitted before any packets of lower priority. Absolute priority, however, is not always desirable. In alternative embodiments, some fraction of the transmission bandwidth available to the TXPP 120 is dedicated to lower priority packet transmission regardless of whether higher priority packets are also pending because packets are often received by the invention faster than they can be transmitted. If some bandwidth were not allocated to lower priority packets in this manner, a bottleneck might be created with lower priority packets not being transmitted due to higher priority packets monopolizing all available transmission bandwidth. Packets are thus scheduled and posted for use by the dual-port handler 804.

The dual-port handler 804 fetches the data from the transmit dual-port memory 803 according to instructions received from the transmit queue dispatch 802. At the start-of-packet boundary, the dual-port handler 804 extracts the FID from the packet and sends the FID to the FID lookup block 808. The dual-port handler 804 also extracts any VLAN tags from the packet and sends this information to the multicast start offset lookup block 806.

In the FID lookup block 808, the FID received from the dual-port handler 804 is used to perform a lookup against a FID table. The FID lookup block 808 functions similarly to the interaction between the FID lookup interface 612 and the FID RAM 614 as presented in FIG. 6. Accordingly, the results obtained from the FID table indicate how the packet should be handled for transmission by the receiving blade. For example, the FID might indicate that although the packet may have arrived at the blade, the packet should not be transmitted by the blade. This might occur in a broadcast situation where a packet is broadcast to all blades within a chassis. If the FID lookup block 808 determines that a packet has been erroneously received in this manner, the packet is deleted and no longer processed by the TXPP 120. In this sense, the FID lookup block 808 also functions as a transmit filter to ensure that only valid packets are actually sent out over the network.

Results of the FID lookup are stored in the delay FIFO 810. This permits the FID lookup block 808 to begin processing the next packet without waiting for the context track and internal header removal block 814 to become available. Pipelining processing data in this manner allows packet processing operations by the TXPP 120 to complete faster.

While the FID lookup block 808 is processing the FID data, the multicast start offset lookup block 806 is processing any VLAN tags received from the dual-port handler 804. A VLAN is a local area network identifier that maps locations based on a basis other than physical location. For example, devices attached to a VLAN might be grouped according to department, division, application, etc. Devices that are part of the same VLAN behave as if they were connected to the same wire even though they may actually be physically connected to different segments of a LAN. VLANs are configured using software protocols rather than in hardware and are therefore extremely flexible with respect to implementation. For example, a computer may be moved to a different physical location on the same VLAN without any hardware reconfiguration.

VLAN tags placed in a header field indicate whether a packet is intended for routing over a VLAN. Additionally, the VLAN tag in the header may also indicate that a packet is intended for VLAN multicasting. VLAN multicasting occurs when a packet is sent over a VLAN to more than one destination address. Since the header of each packet must be changed to reflect each destination address during VLAN multicasting, this process can be very resource intensive when performed using software.

The multicast start offset lookup block 806 supports hardware VLAN multicast replication. The multicast start offset lookup block 806 examines the VLAN tag extracted from the packet header and performs a lookup against a table stored in RAM in the multicast start offset lookup block 806. If the packet VLAN tag matches an entry in the table, additional information pertaining to that VLAN is available at an address location in a memory array stored in the multicast replacement lookup block 812. For example, multicast replacement lookup block 812 might contain information to assist with setting unique VLAN ID values, VLAN priorities, and TXA/SAS/srcport suppression behaviors for each packet transmitted over the VLAN.

The multicast start offset lookup block 806 takes the address to the memory array location of the multicast replacement lookup block 812 and stores this result in the delay FIFO 810. This permits the multicast start offset lookup block 806 to begin processing the next packet without waiting for the context track and internal header removal block 814 to become available. Pipelining processing in this manner allows packet processing operations by the TXPP 120 to complete faster.

In addition to enabling pipelining, the delay FIFO 810 also stores values from the FID) lookup block 808 and the multicast start offset lookup block 806 for retrieval by the multicast replacement lookup block 812 and the context track and internal header removal block 814. The multicast replacement lookup block 812 retrieves the results of the multicast start offset lookup block 806 calculations from the delay FIFO 810 for processing packets subject to VLAN routing. The multicast replacement lookup block 812 takes the address of the memory array location contained in the multicast replacement lookup block 812 and retrieves the additional information that is stored at that location pertaining to routing over the VLAN tag referenced in the packet header. This information is passed to the context track and internal header removal block 814 for incorporation into the outgoing packet header.

Taking the results from the delay FIFO 810 and the multicast replacement lookup block 812, the context track and internal header removal block 814 removes the internal hardware header from the packet and begins the process of assembling an outgoing packet header suitable for transmission over the network. Those skilled in the art will recognize that a number of manipulations to the outgoing packet header must take place before this can occur. The context track and internal header removal block 814 passes information regarding any data offset to the header which may have occurred to the barrel shifter 816. The context track and internal header removal block 814 passes information regarding the TXA/PTYPE to the SA substitution and L3 assist block 818. The context track and internal header removal block 814 passes information regarding the packet VLAN ID and the VLAN tag status to the VLAN insertion block.

The barrel shifter 816 normalizes any changes to the packet header that occurred during internal routing through the chassis. One function of the internal hardware header of a packet is to permit the CPU to add an encapsulation to a packet. Encapsulation is used by the CPU to complete operations more efficiently by avoiding having to copy the entire packet into CPU memory and then writing the packet back to the buffer pool. Instead, the CPU performs a small modification to the packet header. For example, this might occur when the CPU determines that a packet must be forwarded, but that the CPU must first add data to the header before forwarding can take place. Alternatively, the CPU might also remove data from the header temporarily to assist with forwarding.

During this process, the CPU might move data within the packet header into a non-standard format. For example, the destination address might appear at the wrong location within the packet for transmission over the network. The barrel shifter 816 analyzes the composition of the packet header and shifts the data within the header to normalize it and correct for any CPU modifications that might have occurred. When the barrel shifter 816 completes operations on the packet header, the packet header data is then in a standard format and is passed to the SA substitution and L3 assist block 818 for further processing.

The SA substitution and L3 assist block 818 performs further modifications on the packet header to prepare the packet for transmission over the network. The SA substitution and L3 assist block 818 replaces the MAC address that is required for routing packets. In an Ethernet environment, each packet header contains a destination address and a source address. The source address must be changed on transmit to reflect which port the packet is being broadcast from. The SA substitution and L3 assist block 818 also modifies other Layer 3 header fields as required, such as changing the IPv4/IPX time to live value or the checksum.

The packet is passed to the VLAN insertion block 820 for further processing. VLAN tags that were removed on receipt anywhere in the chassis are stored in the internal hardware header for future use on transmission. The VLAN insertion block 820 takes the internal hardware header information that is passed from the context track and internal header removal block 814 and reintroduces this information into the outgoing packet header as appropriate. This information includes the packet VLAN ID and the Tag Status.

When the outgoing header packet is reassembled for transmission over the network, the packet is stored in the TX FIFO 822 prior to being passed to the XGMAC interface 824. The TX FIFO 822 enables the VLAN insertion block 820 to begin processing the next packet without having to wait for the XGMAC interface to become available and enables faster operation by the VLAN insertion block 820.

Additionally, the TX FIFO 822 permits data flow though asynchronous boundaries. In some embodiments of the invention, the TXPP 120 operates at a different speed than the MAC 102. Data flow must be synchronized between asynchronous components so the TX FIFO 822 acts as a bridge between these components. For example, in the Foundry BigIron switch, the MAC 102 operates at a 156.25 MHz clock and the TXPP operates at only a 66 MHz clock.

Figure 9:
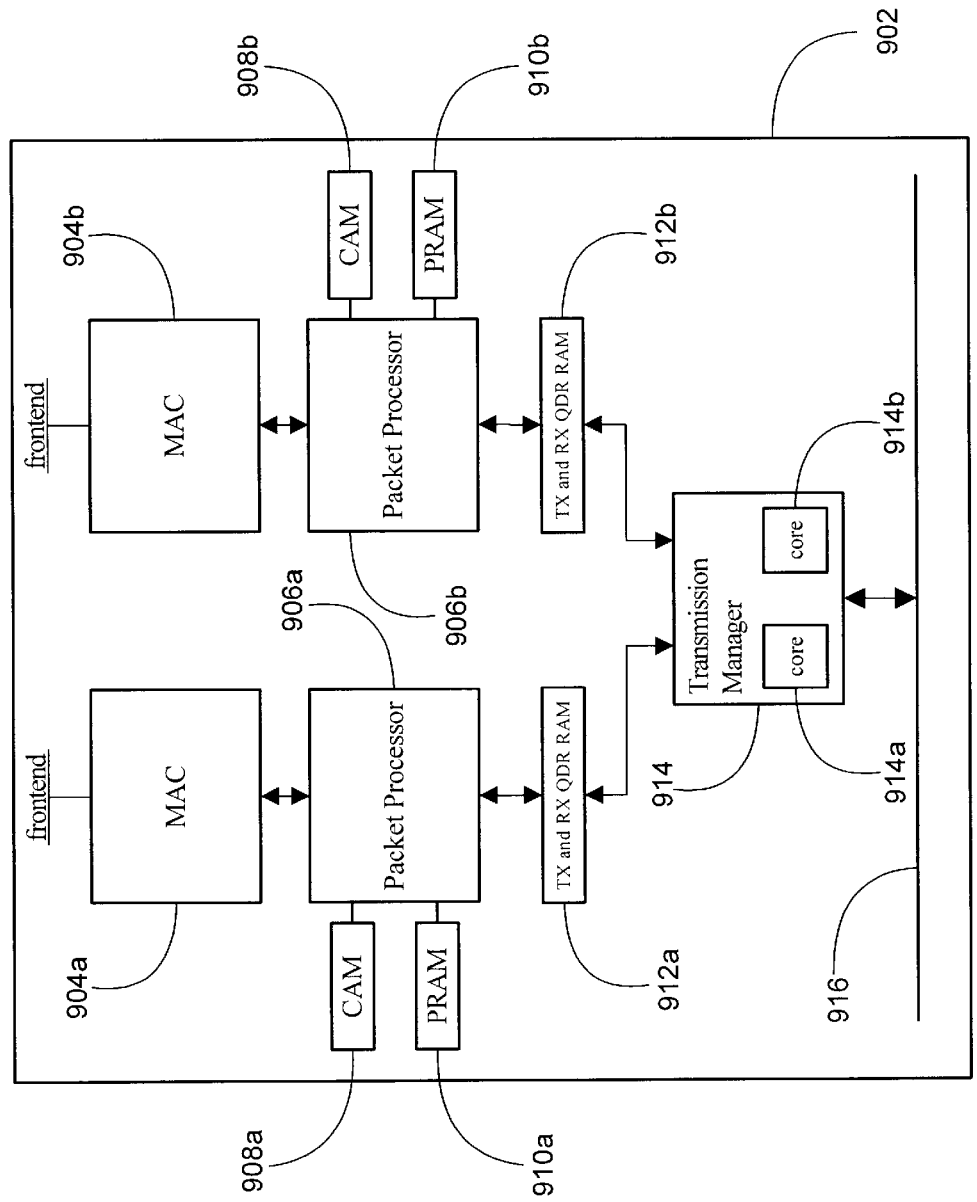
FIG. 9 is a block diagram of a system architecture for an Ethernet blade in accordance with a third embodiment of the present invention.

FIG. 9 illustrates a block diagram presenting a high-level schematic of the components of an alternative embodiment of the invention that allows for data transfer over two ports at speeds at or in excess of 10 gigabits per second. As shown, the invention comprises a printed circuit board ("PCB") 902 used to house and provide interconnections for two media access controllers ("MAC") 904a and 904b, a packet processor ("PP") 906a and 906b coupled to each MAC, one or more content addressable memory ("CAM") controllers 908a and 908b, one or more controllers for random access memories containing parameter information ("PRAM") 910a and 910b, transmit and receive quad data rate ("QDR") random access memory buffers 912a and 912b, a transmission manager 914, and a backplane interface 916. According to this embodiment, each transmit and receive QDR RAM 912a and 912b is depicted as a single module. Those skilled in the art, however, will recognize that multiple QDR RAM or other high speed memory structures may be used to implement distinct transmit and receive memory buffers.

The PCB 902 provides a surface on which to place other components of the invention. The PCB 902, also known as a "blade" or "module", can be inserted into a slot on the chassis of a network traffic management device such as a switch or a router. This modular design allows for flexible configurations with different combinations of blades in the various slots of the chassis according to differing network topologies and switching requirements. Furthermore, additional ports for increased network connectivity may be easily added by plugging additional blades into free slots located in the chassis. The aforementioned components that are mounted on the PCB 902 or blade act in concert to allow data packets to be routed between two ports associated with each MAC 904a and 904b, as well as other blades connected to the chassis.

Each MAC 904a and 904b provides a discrete interface by which data is received and transmitted to and from the network. In one embodiment, such network data comprises Ethernet packets. Each MAC 904a and 904b forwards packets that they receive to their respective PP 906a and 906b for further processing, and also receive packets for transmission to the network from its associated PP 906a and 906b. The MACs 904a and 904b perform data conversion required for the packet processors 906a and 906b to process packets for routing within the device chassis and for data that the packet processors process to be transmitted to the network. For example, in one embodiment of the invention, each MAC 904a and 904b performs data conversions because network data that they receive from their respective frontend ports comprises 32 bit double data rate ("DDR") data, whereas the associated packet processors 906a and 906b each process only 64 bit single data rate ("SDR") data. Typically, the MACs are responsible for data validity checking as well as data gathering.

Each packet processor 906a and 906b is a processor structure, such as an ASIC or FPGA, responsible for receiving packets from an associated MAC 904a and 904b, processing the packets for transmission through the device chassis, and processing packets that they receive from the device chassis via the transmission manager 914 intended for transmission over the network. These two functions, while performed by each packet processor 906a and 906b for its respective port, are preferably performed simultaneously and in parallel. There are thus two processing pipelines implemented in each of the packet processors 906a and 906b: a receive pipeline for processing network packets intended for transmission within the chassis and a transmit pipeline for processing internally routed packets intended for transmission over the network via one of the two ports.

The receive pipeline of each PP 906a and 906b is responsible for packet classification, performing CAM and PRAM lookups, generating packet headers for forwarding packets through a chassis, and preparing packet modifications. Each PP 906a and 906b receives network packets from its respective MAC 904a and 904b in multi-byte bursts based on scheduling priorities determined at a respective MAC 904a and 904b. Each PP 906a and 906b examines packets and extracts packet forwarding information from the packets such as the destination address ("DA") of the packet and the source address ("SA") of the packet. Each PP 906a and 906b extracts the type of service ("TOS"), whether the packet has a virtual local area network ("VLAN") tag, session related data such as in the case of IPv4 or IPX data, and other additional Layer 3 and Layer 4 information useful in routing the packet through the chassis. Each PP 906a and 906b also passes the forwarding information that it extracts from the packet header to a CAM processor, 908a and 908b respectively, for further processing.

Each of the CAM controllers or processors 908a and 908b takes information forwarded by its respective PP 906a and 906b and performs a lookup comparing this information to data stored in a local memory of the CAM processor 908a and 908b. If the information matches information stored in the local memory of the CAM processor 908a and 908b, additional forwarding information regarding disposition of the packet is available in the local memory of the given packet processor's PRAM processor 910a and 910b, which it may retrieve for future incorporation into the packet header. When such successful CAM matches occur, each of the corresponding PRAM processors 910a and 910b retrieves additional forwarding information from its local memory for incorporation into the header of the packet. The packet is reformatted with a new internal hardware header for routing the packet within the chassis, which the PP 906a and 906b stores in a corresponding transmit and receive QDR RAM 912a and 912b for processing by the transmission manager 914. This internal hardware header is also sometimes referred to as a chassis header.

The transmit and receive QDR RAM 912a and 912b acts as a pipeline buffer in the embodiment of the invention depicted in FIG. 9. The transmit and receive QDR RAM 912a and 912b enables each PP 906a and 906b to store packets that they process and continue processing the next packet without having to wait for the transmission manager 914 to become available, thereby expediting operations of both the packet processors 906a and 906b and the transmission manager 914. Other buffers are used throughout the system and in its various components, as further described herein, to achieve pipelining and faster packet processing in an analogous manner.

While the packet processors 906a and 906b handle traffic to and from their respective MACs 904a and 904b, as well as conversions of packet headers between network packet headers and internal chassis packet headers, the transmission manager 914 handles traffic flow to and from the backplane interface 916. Similar to the packet processors 906a and 906b, the transmission manager 914 is a processor chip that implements a quad pipeline architecture: a receive pipeline for network data to be internally routed within the device chassis and a transmit pipeline for internally routed data intended for network transmission. To support two ports on each blade, the transmission manager 914 implements a separate transmit and receive pipeline for each port in each of its transmit cores 914a and 914b. These functions, while performed on the same chip, are preferably performed in parallel according to one embodiment of the invention. In one embodiment of the invention, the transmission manager 914 is an FPGA, although use of other processor types such as an ASIC is within the scope of the invention.

Advantageously and as is explained in greater detail herein, the transmission manager 914 implements two transmission cores 914a and 914b to handle the transmission of packets to and from both packet processors 906a and 906b in a parallel fashion, thereby implementing the receive and transmit pipelines for each port on a single chip. The transmission manager 914 fetches network data intended for routing through the device chassis from each transmit and receive QDR RAM 912a and 912b and stores internally routed data intended for network transmission back into the appropriate transmit and receive QDR RAM 912a and 912b. The receive pipeline of each transmission core 914a and 914b in the transmission manager 914 retrieves data from the transmit and receive QDR RAM 912a and 912b according to instructions issued to the transmission manager 914 by each PP 906a and 906b associated with a given transmit and receive QDR RAM 912a and 912b. The transmission manager 914 determines data transmission priority for the data retrieved and schedules transmissions to the backplane 916 according to this priority scheme through implementation of a plurality of transmission queues or FIFOs, which are used to alleviate head of line blocking issues between packets destined for other blades in the chassis.

The transmit pipeline of each transmission core 914a and 914b in the transmission manager 914 handles internally routed packets received from the backplane interface 916 and intended for transmission over the network. The transmission manager 914 collects packets from the backplane interface 916 and organizes them into per-source, per-priority transmit queues stored in the transmit and receive QDR RAM 912a and 912b. Each transmit core 914a and 914b in the transmission manager 914 notifies its respective PP 906a and 906b when a packet is stored in the transmit and receive QDR RAM 912a and 912b is available for processing.

Figure 10:
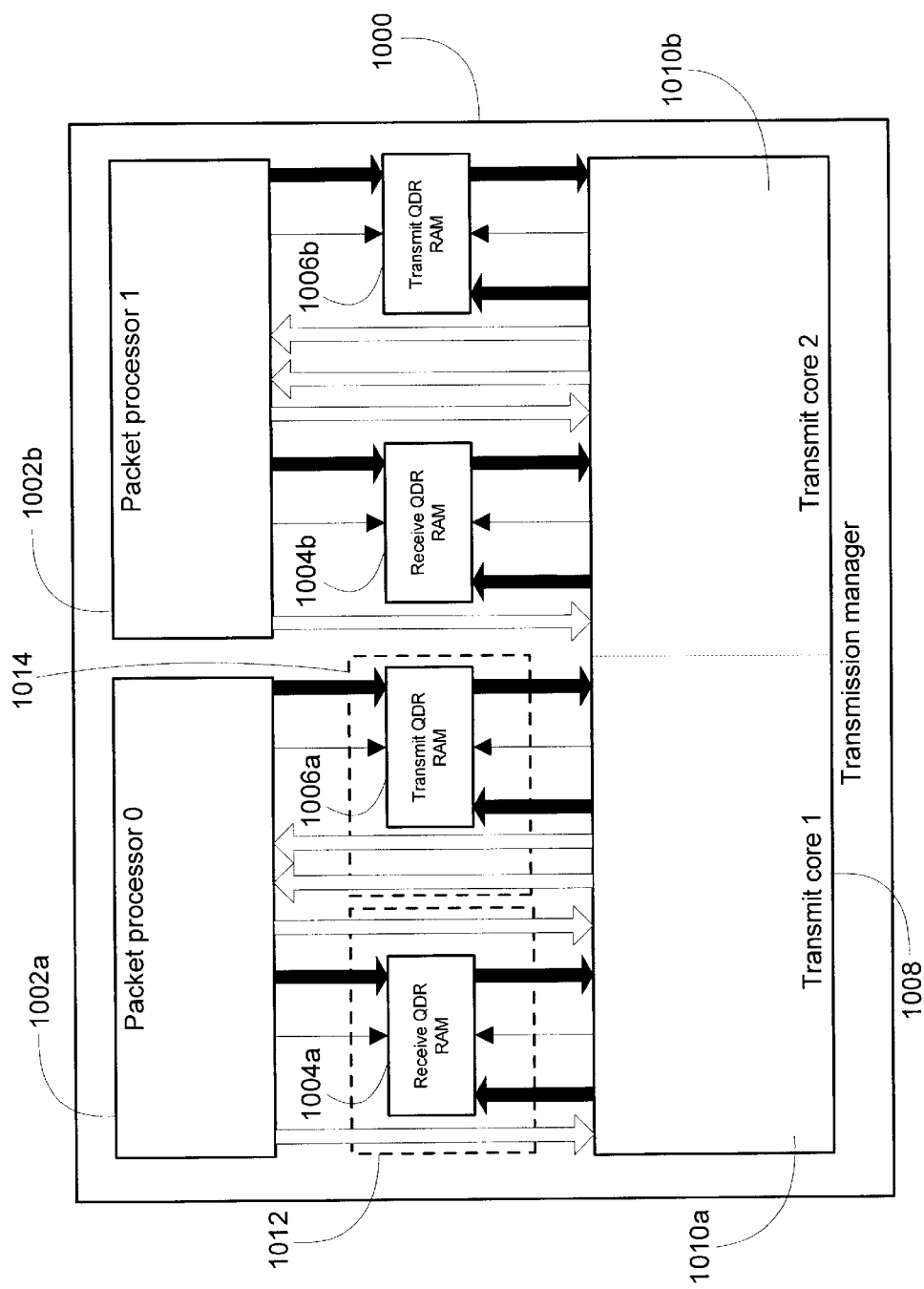
FIG. 10 is a block diagram of an exemplary data flow between two packet processors and a transmission manager in an Ethernet blade in accordance with one embodiment of the present invention.

One embodiment of the data flow between the packet processors, their associated QDR RAM and each transmit core of the transmission manager is presented in FIG. 10. Each transmission port (not pictured) on the blade 1000 comprises a connection to one of a plurality of given packet processors 1002a and 1002b. As described above and represented in the figures, the packet processors 1002a and 1002b provide functionality that provides for initial processing of packets, including CAM and PRAM lookups that are used to modify header information that each packet comprises. By modifying packet header information, the packet processors 1002a and 1002b provide an indication as to how the transmission manager 1008 should route the packets to their destination.

Each of the packet processors 1002a and 1002b implement multiple data pipelines to speed up data processing. Accordingly, each packet processor 1002a and 1002b implements a receive pipeline 1012 and a transmit pipeline 1014. When packet processing that the packet processors perform is complete, the packet is put into a receive QDR RAM 1004a and 1004b. The receive QDR RAM 1004a and 1004b serves as a buffer in the receive pipeline 1012, allowing the packet processors 1002a and 1002b to continue processing incoming packets that the MAC interfaces (not pictured) are forwarding.

The transmission manager 1008 implements a dual transmit core architecture whereby each of the transmit cores 1010a and 1010b provides transmission and reception functionality to a given one of the packet processors 1002a and 1002b. When the given transmit core 1010a and 1010b associated with a given receive QDR RAM 1004a and 1004b is available, the transmit core 1010a and 1010b gets the next data packet from its receive QDR RAM 1004a or 1004b for processing and dispatch, e.g., over the backplane or to an alternate transmit core. Likewise, the transmit core 1010a and 1010b processes packets that it receives, e.g., from the backplane or alternate transmit core, and dispatches the packets to the transmit QDR RAM 1006a and 1006b over its transmit pipeline 1014. As can be seen, each packet processor 1002a and 1002b implements two data pipelines, one transmit and one receive, whereas the transmission manager 1008 implements four data pipelines, one transmit and one receive pipeline for each transmit core 1010a and 1010b.

Receive QDR RAM 1004a and 1004b, as well as transmit QDR RAM 1006a and 1006b, is particularly suitable for pipelined packet processing and storage in high-speed networking applications where symmetrical high write and read bandwidth is needed. Unlike dualport memory illustrated in conjunction with other embodiments of the invention, QDR RAM has only one address port for both write and read addressing, e.g., write addresses and read addresses must be multiplexed.

While previous embodiments demonstrate the external placement of the multiplexing structure, the packet processor 1002a and 1002b and transmission manager 1008 may implement the multiplexer to achieve the goals of higher integration and reducing the number of components. In the receive direction, the packet processor 1002a and 1002b writes to the receive QDR RAM 1004a and 1004b and the transmission manager 1008 reads from the receive QDR RAM 1004a and 1004b. The transmission manager 1008 may implement a receive QDR address multiplexer (not pictured) whereby the packet processor 1002a and 1002b sends the receive QDR write address to the transmission manager 1008. In the transmit direction, the transmission manager 1008 writes to the transmit QDR RAM 1006a and 1006b and the packet processor 1002a and 1002b reads from the transmit QDR RAM 1004a and 1004b. The packet processor 1002a and 1002b may implement a transmit QDR address multiplexer (not pictured) whereby the transmission manager sends the transmit QDR write address to the packet processor 1002a and 1002b.

Figure 11:
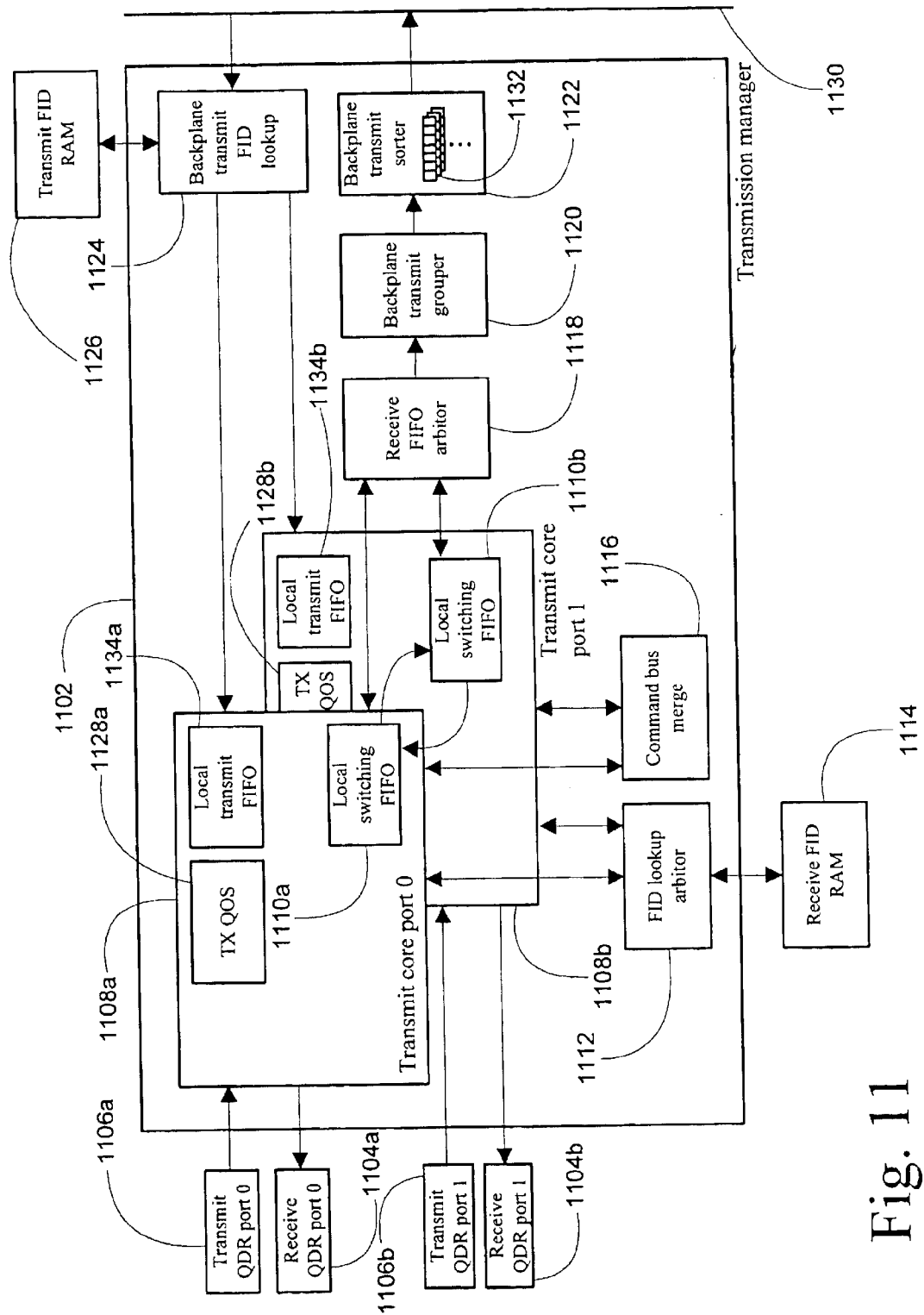
FIG. 11 is a block diagram presenting the components comprising a transmission manager and its associated external structures in accordance with one embodiment of the present invention.

FIG. 11 illustrates a more detailed block diagram of the internal architecture of the transmission manager according to one embodiment of the present invention. Each of the ports on a given blade, e.g., port 0 and port 1, is associated with a given receive QDR RAM 1104a and 1104b, respectively. These QDR RAM 1104a and 1104b, which act as high speed ram buffers, queue packets that have been processed and are ready for transmission to their destination, e.g., a port on the blade or another blade connected via the backplane to the chassis. According to some embodiments, a priority scheme is implemented in the receive QDR RAM 1104a and 1104b to prioritize the sequence in which the transmission manager 1102 retrieves packets for processing. Within the transmission manager 1102, a transmission core 1108a and 1108b associated with each port retrieves queued packets from its receive QDR RAM 1104a and 1104b, respectively, for processing. It should also be noted that, in addition to the components depicted in FIG. 11, the transmission manager may implement some or all of the structures and functionality associated with other embodiments of the invention described heretofore. Furthermore, it should be apparent to one of skill in the art from the subsequent discussion that the number of transmit cores 1108a and 1108b and, therefore, the number of ports that a given blade can support, is limited only by the physical space available on the chip on which the transmission manager 1102 is implemented.

The transmit cores 1108a and 1108b fetch data from the receive QDR RAM 1104a and 1104b based on instructions received by other components on the blade. At the start-of-packet boundary, each of the transmit cores 1108a and 1108b extracts a forwarding identifier ("FID") from each packet and sends the FID to a FID lookup arbiter 1112. The FID is an abstract chassis/system wide number used to forward packets. Each packet type has a FID to instruct the blade how to handle a given type of packet. This allows each blade in the chassis to look at the FID separately to decide how to individually forward the packet. For example, the FID can instruct the transmit core 1108a and 1108b to transmit a given packet to one or more destinations on the backplane, a port on the blade receiving the packet, a port on the blade other than the one receiving the packet or a combination of these destinations. As will be explained herein, each transmit core 1108a and 1108b implements a local switching FIFO 110a and 1110b, respectively, to pass packets between transmit cores without requiring the packet to be transmitted over the backplane, e.g., "one arm routing" between transmission cores.

Figure 12:
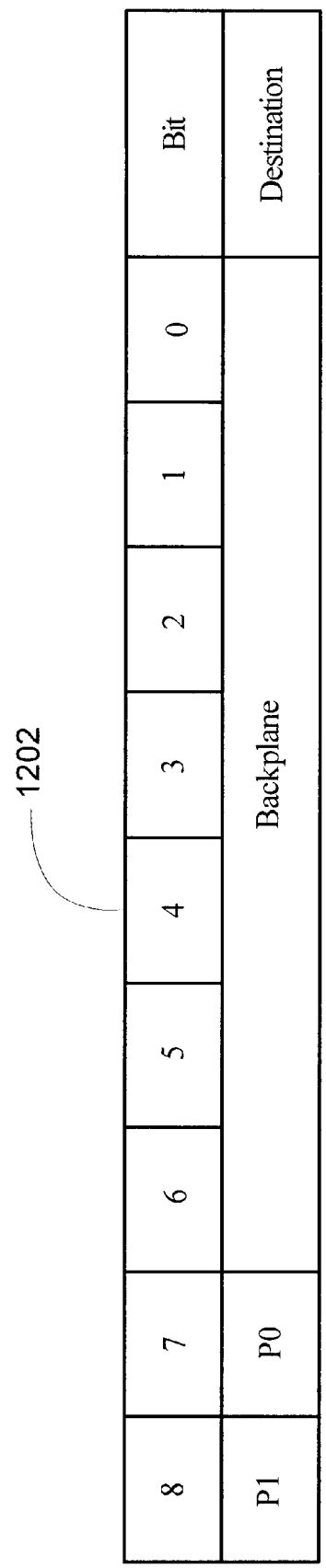
FIG. 12 is a block diagram presenting a FID port mask used assist in to properly routing packets within an Ethernet blade in accordance with one embodiment of the present invention.

Because each transmission core is implementing a receive pipeline, FID values for two sets of data must be processed to determine routing information. The FID lookup arbiter 1112 implements an algorithm to equitably select packets for processing. According to one embodiment, the FID lookup arbiter 1112 uses the priority scheme implemented in the receive QDR RAM 1104a and 1104b to select packets for FID processing. The FID lookup arbiter 1112 translates the FID of the packet that it selects into a port mask by performing a lookup against addresses stored in the receive FID RAM 1114. The port mask is a multi-bit field representing the two ports on the blade and other possible backplane slot destinations in the device chassis. FIG. 12 presents one embodiment of a FID port mask. According to this embodiment, the port mask 1202 is a 9-bit field representing the two 10 Gigabit Ethernet ports on the blade and seven other possible backplane slot destinations. By setting one or more bits in the port mask 1202, each transmission core 1108a and 1108b is able to determine the proper destination or destinations for a given packet.

The transmit cores 1108a and 1108b utilize the FID port mask to determine how to properly route a packet. To allow packets to be routed between ports on a given blade, each transmit core 1108a and 1108b implements a local switching FIFO 110a and 1110b. Where a given transmit core determines that a packet that it is currently processing is destined for its counterpart port, e.g., port 0 receives a packet which transmit core 0 determines as a result of FID processing that the blade must transmit the packet over port 1, the transmit core places the packet on the local switching FIFO 1110a and 1110b of the destination transmit core. Alternatively, each transmit core 1108a and 1108b may place packets on its own local switching FIFO 1110a and 1110b, respectively, which is polled in accordance with a polling schedule to retrieve packets for transmission in its associated port. Essentially, the local switching FIFOs 1110a and 1110b provide a data pathway for switching packets between ports for transmission without having to route the packets over the backplane, unless a copy of the packet is also destined for a location on the backplane. As is explained herein, packets that the transmit cores 1108a and 1108b pull from the local switching FIFO 1110a and 1110b for transmission over its associated port are passed to the transmission quality of service module 1128a and 1128b for transmission scheduling.

Where the transmit cores 1108a and 1108b determine that they must route a packet to the backplane, a receive FIFO arbiter 1118 manages data traffic out of the receive pipeline of each transmit core 1108a and 1108b. The receive FIFO arbiter 1118 acts as a buffer in the receive pipeline of the transmission manager 1102 by queuing packets from the receive pipeline of the transmission cores 1108a and 1108b. By providing the FIFO buffer, the receive FIFO arbiter 1118 frees the transmit cores 1108a and 1108b to continue pulling packets from their respective receive QDR RAM 1104*a* and 1104*b* for processing. Packets are queued until subsequent components in the receive pipeline 1120, 1122 are free. The receive FIFO arbiter 1118 analyzes traffic output from the transmit cores 1108*a* and 1108*b* to calculate from which transmit core to accept packets for placement on the FIFO during a given clock cycle.

The backplane transmit grouper 1120 funnels 32 byte wide data that each transmit core 1108*a* and 1108*b* fetches from the receive QDR RAM 1104*a* and 1104*b* into multiple 4 byte wide data that matches the width of the backplane, in addition to generating sideband information for the backplane 1130. The backplane transmit grouper 1120 is also aware of which backplane destination or destinations to which a given QDR RAM data line wishes to transfer data. In the case where multiple backplane destinations are indicated the backplane transmit grouper 1120 performs data line replication to multiple backplane destinations. The backplane transmit grouper 1120 may also comprise multiple asynchronous FIFOs that couple data from the QDR RAM at a specific clock rate into the backplane clock rate. The backplane transmit grouper 1120 may generate four byte wide data plus sideband information for processing by the backplane transmit sorter 1122.

When components comprising the receive pipeline of each transmit core 1108*a* and 1108*b* process packets from the receive QDR RAM 1104*a* and 1104*b*, the components modify the header information associated with each packet to instruct the transmission manager 1102 how it should route the packet through the pipeline. The backplane transmit sorter 1122 resides at the boundary between the transmission manager 1102 and the backplane 1130, acting as a regulator to control the flow and destination of data that the transmission manager 1102 processes. The backplane transmit sorter 1122 implements a number of dispatch FIFOs 1132 onto which packets of data are put from the backplane transmit grouper 1120 for transmission over the backplane 1130. According to one embodiment, the backplane transmit sorter 1122 implements a number of dispatch FIFOs 1132 equal to the number of possible destination slots comprising the chassis that are connected to the backplane 1130.

Where the backplane transmit sorter implements a lesser number of FIFOs, e.g., one FIFO for all data packets that the transmission manager 1102 is dispatching to the back plane 1130, "head of line blocking" typically occurs with high frequency. Head of line blocking may be explained as follows: suppose an input link in a switch has an associated FIFO which contains a packet destined for a given output link. Where the given output link is occupied or otherwise busy, the input link is forced to idle until the output link becomes available, thereby causing other packets in the FIFO destined for other output links to potentially be held up unnecessarily. By applying a sorting algorithm and a number of dispatch FIFOs 1132 approaching the number of destination slots on the backplane 1130, the blocking condition is significantly reduced or possibly eliminated. According to embodiments of the invention, the backplane transmit sorter 1122 comprises logic that is operative to monitor the availability status of destinations on the backplane 1130 and reorder the packets in each of the dispatch FIFOs 1132 to optimize transmission of the packets over the backplane 1130. In this regard, a round-robin arbiter may examine backplane destination congestion status as well as FIFO 1132 availability to decide which FIFOs 1132 to read from and in turn transmit data to the backplane 1130.

As packets arrive at the transmission manager 1102 from the backplane 1130 for transmission over one of the blade's ports, a backplane transmit FID lookup module 1124 processes each data packet. The backplane transmit FID lookup module performs a lookup against destination data in a transmit FID RAM 1126. The transmit FID RAM 1126 returns a two bit value that instructs the backplane transmit FID lookup module 1126 the appropriate transmit core 1108*a* and 1108*b* to which the packet is to be sent. Because the transmit FID RAM 1126 returns a two bit value, the backplane transmit FID lookup 1124 may send the packet to transmit core 0 (1108*a*), transmit core 1 (1108*a*), both transmit cores, or neither transmit core, in which case the backplane transmit FID lookup module 1124 drops the packet. Packets can additionally or alternatively be sent to other destinations, such as a CPU for processing or a monitor for debugging purposes. When the backplane transmit FID lookup module 1124 completes processing the data packet, which may comprise modifying the information in the packet's header, it forwards the packet to the proper destination, e.g., transmit core 1108*a* and 1108*b*.

Each transmit core 1108*a* and 1108*b* receives data packets from the backplane transmit FID lookup module 1124 and places the packets in a local transmit FIFO 1134*a* and 1134*b* for storage prior to transmission scheduling by the transmission quality of service (QOS) component 1128*a* and 1128*b*, respectively. According to some situations, data packets in the local transmit FIFO 1134*a* and 1134*b* and data packets in the local switching FIFO 1110*a* and 1110*b* in a given transmit core are ready for transmission at the same time. The transmission QOS module 1128*a* and 1128*b* may implement one or more QOS techniques that are well know to those of skill in the art, which provide functionality to measure, improve, and possibly guarantee transmission rates, error rates and other characteristics in advance of transmission.

According to one embodiment, the header of each data packet that the transmission manager 1102 receives from the backplane 1130 comprises QOS data. The transmit QOS module examines the QOS header information in each packet at the head of both the local transmit FIFO 1134*a* and 1134*b* and the local switching FIFO 1110*a* and 1110*b*. The transmit QOS module 1128*a* and 1128*b* selects a data packet from one of the FIFOs based on the QOS header information in the data packet and according to a given QOS algorithm that the transmit QOS module 1128*a* and 1128*b* implements. The data packet that the transmit QOS module selects is placed in an associated transmit QDR RAM 1106*a* and 1106*b* associated with the transmit pipeline for the given transmit core of which the transmit QOS module is part. The transmit QDR RAM 1106*a* and 1106*b* buffers packets that a given transmit core 1108*a* and 1108*b* in the transmission manager 1102 processes until the packet processor that is associated with the destination port is available to get the next packet in a given transmit QDR RAM 1106*a* and 1106*b*.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A system for providing data transmission speeds at or in excess of 10 gigabits per second between one or more source devices and one or more destination devices, the system comprising:

first and second media access control (MAC) interfaces to facilitate receipt and transmission of packets over an associated set of physical interfaces;

first and second field programmable gate arrays (FPGA) coupled to the MAC interfaces and associated first and second memory structures, the first and second FPGAs each configured to perform initial processing of packets received from the associated first and second MAC interfaces, respectively, and to schedule the transmission of packets to the first and second MAC interfaces, respectively, for transmission to one or more destination devices, the first and second FPGAs each further operative to dispatch and retrieve packets to and from the first and second memory structures, respectively; and a third FPGA coupled to the first and second memory structures and a backplane, the third FPGA operative to retrieve and dispatch packets to and from the first and second memory structures and the backplane, compute appropriate destinations for packets and organize packets for transmission.

2. The system of claim 1 wherein the first and second memory structures are quad data rate (QDR) memory modules.

3. The system of claim 1 comprising a plurality of FIFO structures within the first, second and third FPGAs to provide for pipelined processing of data.

4. The system of claim 3 wherein the first and second FPGAs are operative to transfer data in at least 64 bit packets.

5. The system of claim 4 wherein the first and second FPGAs are each configured to perform CAM and PRAM lookups for received packets.

6. The system of claim 5 wherein the first and second FPGAs are each configured to perform multiple CAM and PRAM lookups in parallel.

7. The system of claim 6 wherein at least one of the multiple CAM lookups is a source address lookup and at least one other one of the multiple CAM lookups is a destination address CAM lookup.

8. The system of claim 6 wherein at least one of the multiple PRAM lookups is a sources address PRAM lookup and at least one other one of the multiple PRAM lookups is a destination address PRAM lookup.

9. The system of claim 3 wherein the third FPGA comprises first and second transmit cores, each of the first and second transmit cores operative to provide a receive and transmit pipeline for a given one of the field and second FPGAs, the first and second transmit cores further operative to receive packets from the first and second memory structures and process the packets for dispatch to their intended destinations.

10. The system of claim 9 wherein the first and second transmit cores each comprise a local switching FIFO operative to transfer packets between the first transmit core and the second transmit core.

11. The system of claim 10 wherein the first and second transmit cores each comprise a transmit quality of service module operative to determine an order in which packets received at a given one of the first and second transmit cores from the backplane and the local switching FIFO are transmitted to a given one of the first and second memory structures.

12. The system of claim 3 wherein the third FPGA comprises a backplane transmit sorter operative to organize packets for dispatch to one or more slots on the backplane.

13. The system of claim 12 wherein the backplane transmit sorter implements a number of FIFOs to organize packets prior to transmission to the one or more slots on the backplane.

14. The system of claim 13 wherein the backplane transmit sorter implements a number of FIFOs equal to a number of slots on the backplane.

15. The system of claim 3 wherein the third FPGA comprises a receive FIFO arbiter operative to arbitrate the receipt of data from a plurality of transmit cores for placement in one or more receive FIFOs.

16. The system of claim 3 wherein the third FPGA comprises a backplane transmit grouper operative to modify the size of a data packet for transmission over the backplane.

17. A method for providing data transmission speeds at or in excess of 10 gigabits per second between one or more source devices and one or more destination devices, the method comprising:

receiving packets over a first and second media access control (MAC) interfaces, the first and second MAC interfaces operative to facilitate receipt and transmission of packets over a first and second physical interfaces;

pipelining data bi-directionally through a first and second processors coupled to the first and second MAC interfaces and a first and second memory structures, the first and second processors configured to perform initial processing of received packets to be buffered in the first and second memory structures and scheduling packets for transmission to the MAC interface for transmission to one or more destination devices over the first and second physical interfaces, the first and second processors further operative to dispatch and retrieve packets to and from the first and second memory structures; and implementing dual bi-directional data pipelines through a third processor coupled to the first and second memory structures and a backplane, the second processor configured to compute an appropriate destination for a packet and organize packets for transmission.

18. The method of claim 17 comprising pipelining data bi-directionally through the first and second memory structures coupled to the first processor and the second processor.

19. The method of claim 17 comprising pipelining through a first, second and third processor wherein each processor comprises a field programmable gate array (FPGA).

20. The method of claim 17 wherein pipelining is accomplished through the use of a plurality of FIFOs in the first, second and third processors.

21. The method of claim 20 wherein pipelining data bi-directionally through the first and second processors comprises performing CAM and PRAM lookups for received packets.

22. The method of claim 21 comprising pipelining CAM and PRAM lookups through the use of a plurality of FIFOs.

23. The method of claim 20 wherein pipelining data bi-directionally through the first and second processors comprises performing multiple CAM and PRAM lookups in parallel.

24. The method of claim 23 wherein performing at least one of the multiple CAM lookups comprises a source address and performing at least one other one of the multiple CAM lookups comprises a destination address.

25. The method of claim 23 wherein performing at least one of the multiple PRAM lookups comprises a source address and performing at least one other one of the multiple PRAM lookups comprises a destination address.

26. The method of claim 17 wherein implementing dual bi-directional data pipelines through the third processor comprises issuing packets on the backplane.

27. The method 17 wherein implementing dual bi-directional data pipelines through a third processor comprises implementing a bi-directional data pipeline in each of a first and second transmit cores, each of the first and second transmit cores operative to provide a receive and transmit pipeline for a given one of the first and second processors, the first and second transmit cores further operative to receive packets from the first and second memory structures and process the packets for dispatch to their intended destinations.

28. The method of claim 27 wherein implementing a bi-directional data pipeline in each of a first and second transmit cores comprise implementing a local switching FIFO operative to transfer packets between the first transmit core and the second transmit core.

29. The method of claim 28 wherein implementing a bi-directional data pipeline in each of a first and second transmit cores comprises implementing a transmit quality of service module in the first and second transmit cores operative to determine the order in which packets received at a given one of the first and second transmit cores from the backplane and the local switching FIFO are transmitted to a given one of the first and second memory structures.

30. The method of claim 17 wherein implementing dual bi-directional data pipelines through a third processor comprises implementing a backplane transmit sorter operative to organize packets for dispatch to one or more slots on the backplane.

31. The system of claim 30 wherein implementing the backplane transmit sorter comprises implementing a number of FIFOs to organize packets prior to transmission to the one or more slots on the backplane.

32. The method of claim 31 wherein implementing the backplane transmit sorter comprises implementing a number of FIFOs equal to a number of slots on the backplane.

33. The system of claim 17 wherein implementing dual bi-directional data pipelines through a third processor comprises implementing a receive FIFO arbiter operative to arbitrate the receipt of data from a plurality of transmit cores for placement in one or more receive FIFOs.

34. The method of claim 17 wherein implementing dual bi-directional data pipelines through a third processor comprises a backplane transmit grouper operative to modify the size of a data packet for transmission over the backplane.

35. A system for providing data transmission speeds at or in excess of 10 gigabits per second between one or more source devices and one or more destination devices, the system comprising:

a first and second transmit and receive data pipelines, the first and second transmit and receive data pipelines used to couple a first and second medial access control (MAC) interfaces to facilitate receipt and transmission packets over a physical interface, and a first and second packet processors configured to perform initial processing of received packets that are buffered in a first and second memory structures; and a third and fourth transmit and receive data pipelines, the third and fourth transmit and receive data pipelines used to couple a transmission manager to a backplane and the first and second transmit and receive data pipelines, the third and fourth transmit and receive data pipelines configured to receive packets from a backplane, organize the packets for transmission that are buffered in the first and second memory structures and schedule the transmission of packets on the backplane.

36. The system of claim 35 wherein the first, second, third and fourth transmit and receive data pipelines comprise a plurality of FIFO structures to provide for pipelined processing of data.

37. The system of claim 35 wherein the first and second packet processors and the transmission manager are field programmable gate arrays (FPGAs).

38. The system of claim 35 wherein the first and second packet processors and the transmission manager are application specific integrated circuits.

39. The system of claim 35 wherein the first and second memory structures are quad data rate memory structures.

* * * * *